Aug. 24, 1965   A. T. GONIA ETAL   3,202,185
METHOD FOR BENDING SINUOUS STRIPS
Original Filed June 24, 1957   14 Sheets-Sheet 6
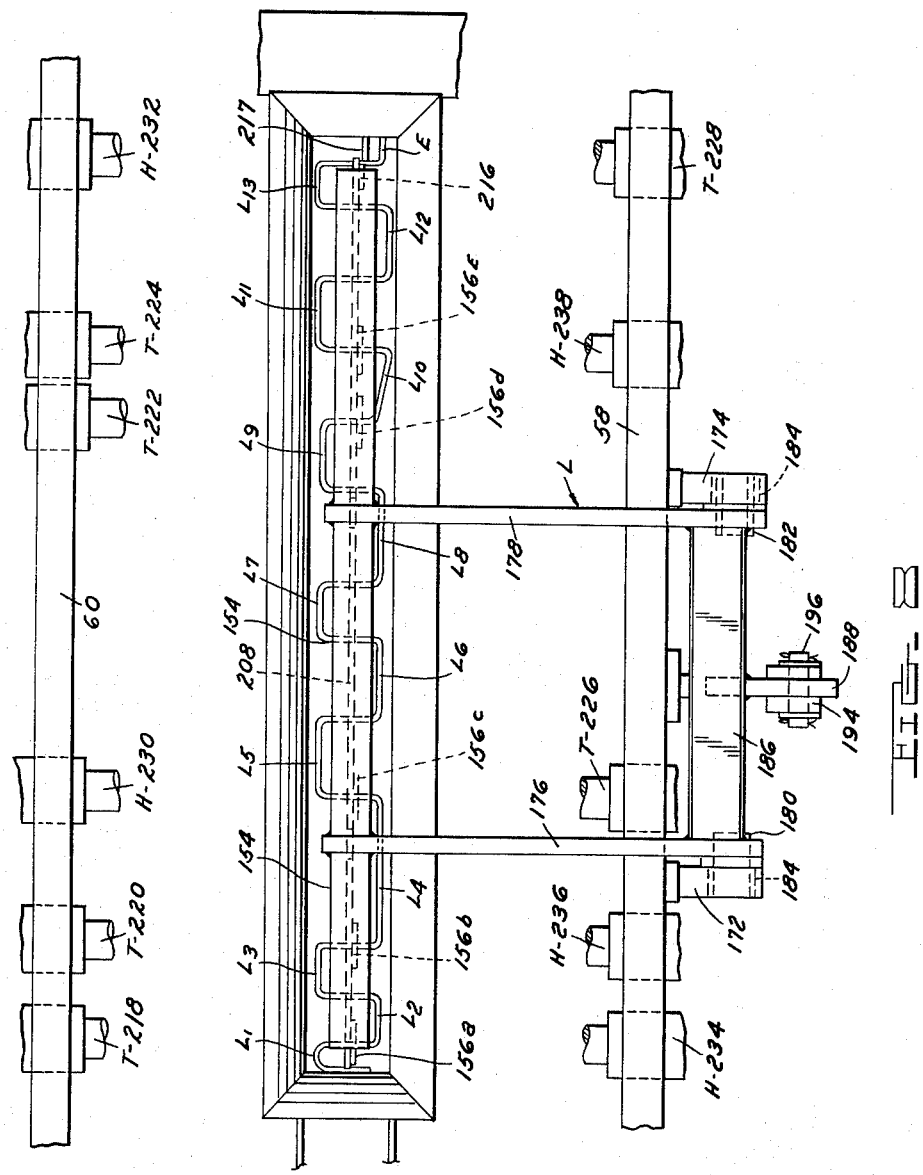
INVENTORS
AUGUST T. GONIA
HARRY H. FANTE
BY MITCHELL J. SHEPARD
Strauch, Nolan & Neale
ATTORNEYS

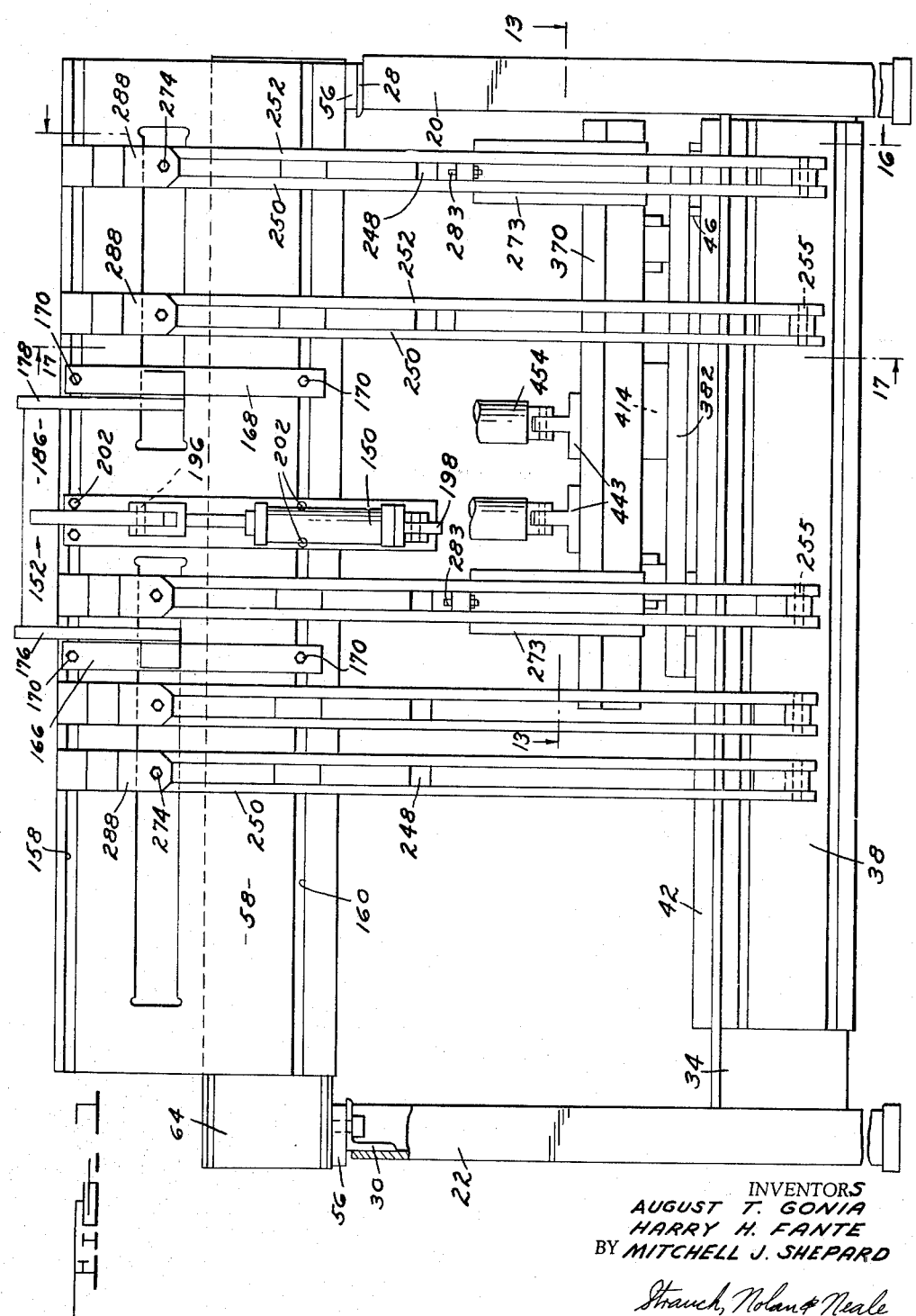

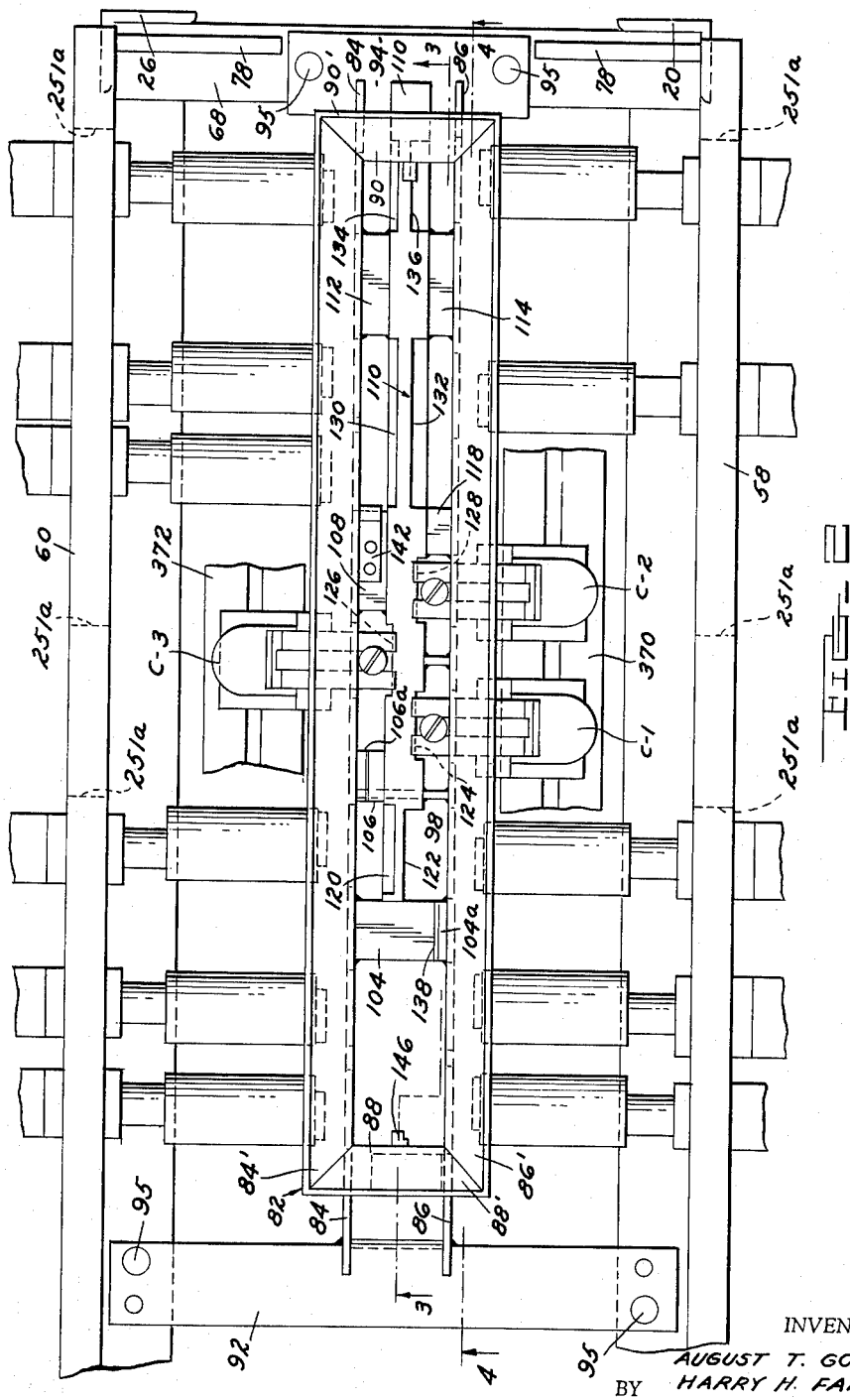

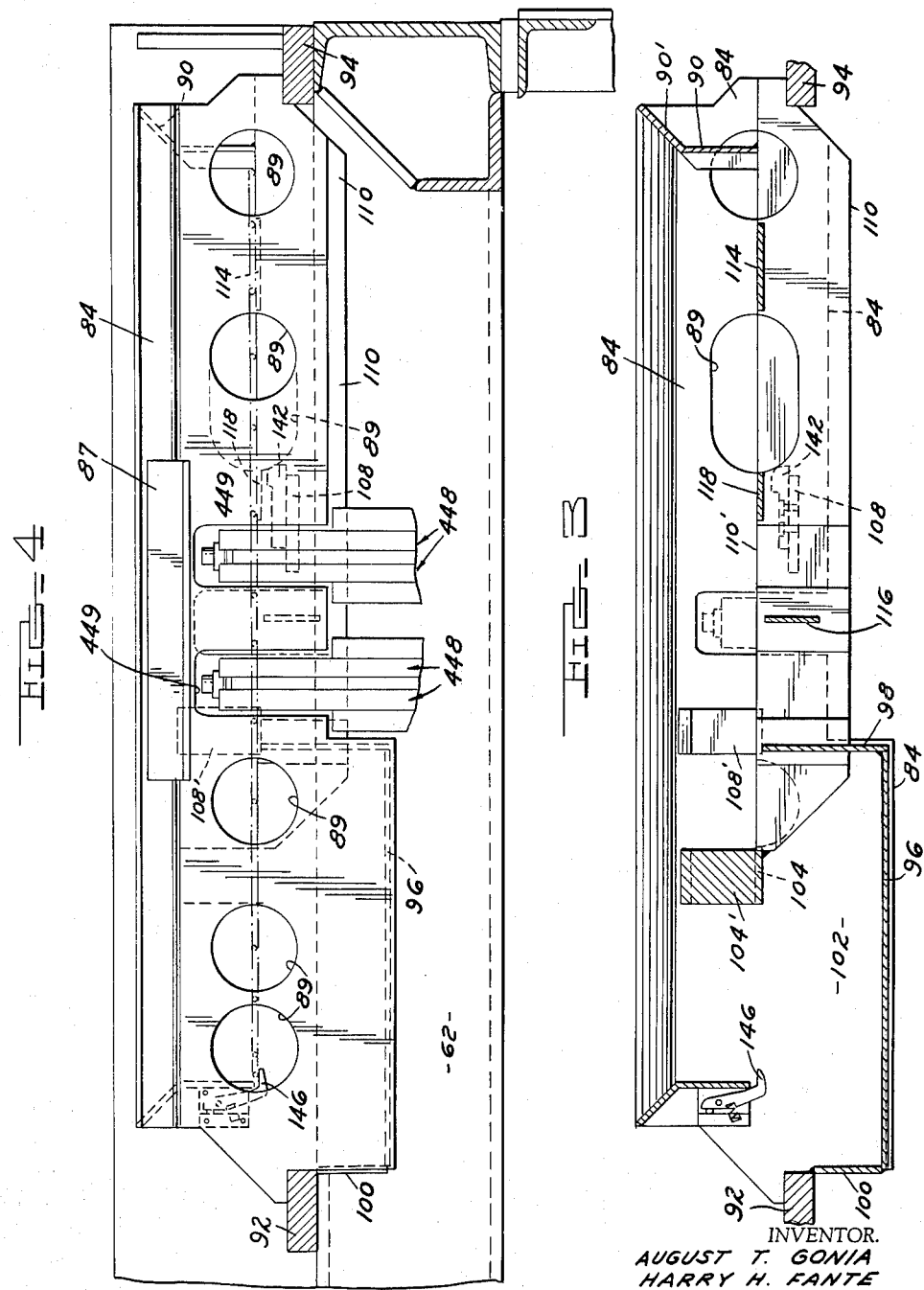

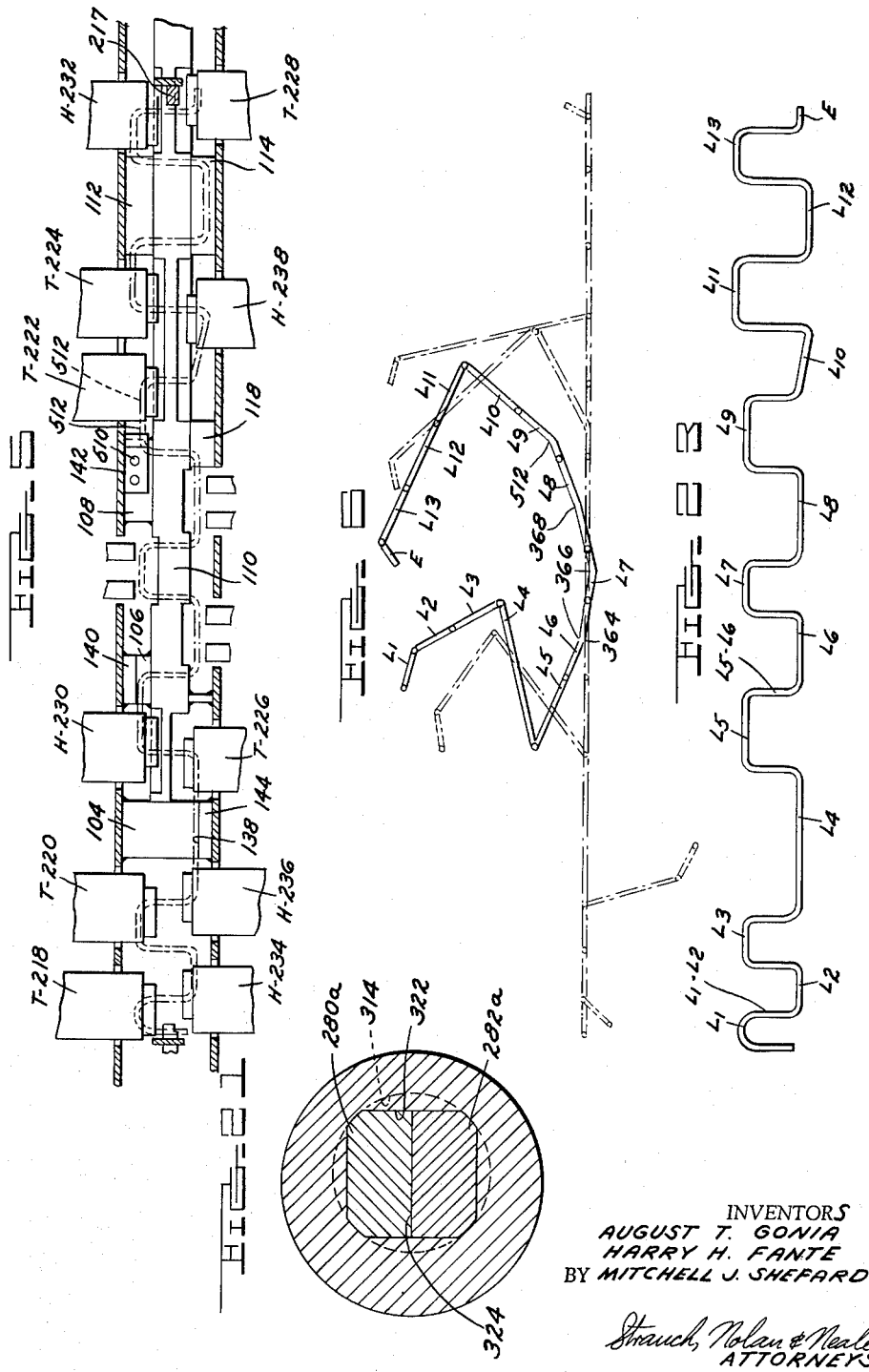

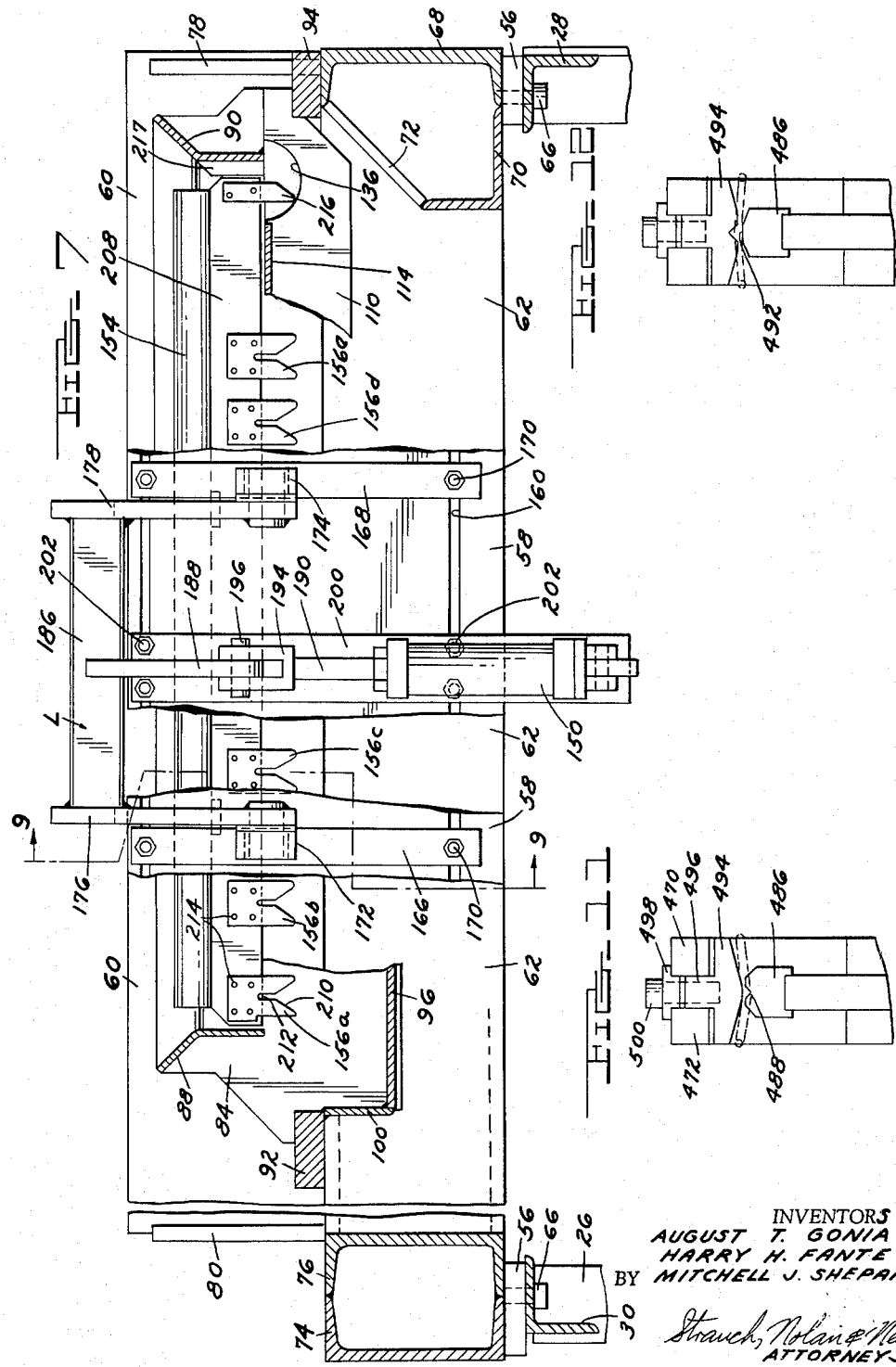

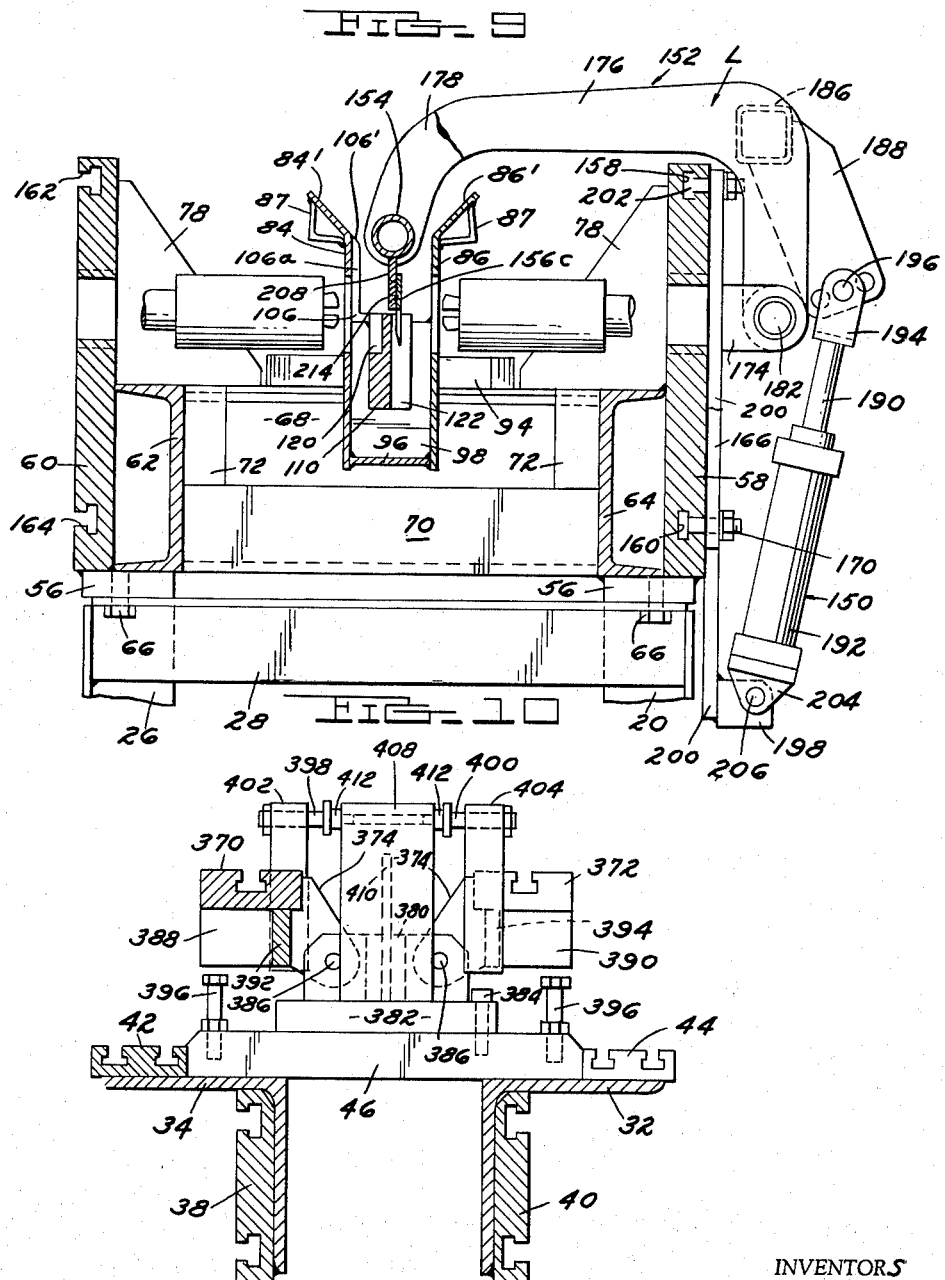

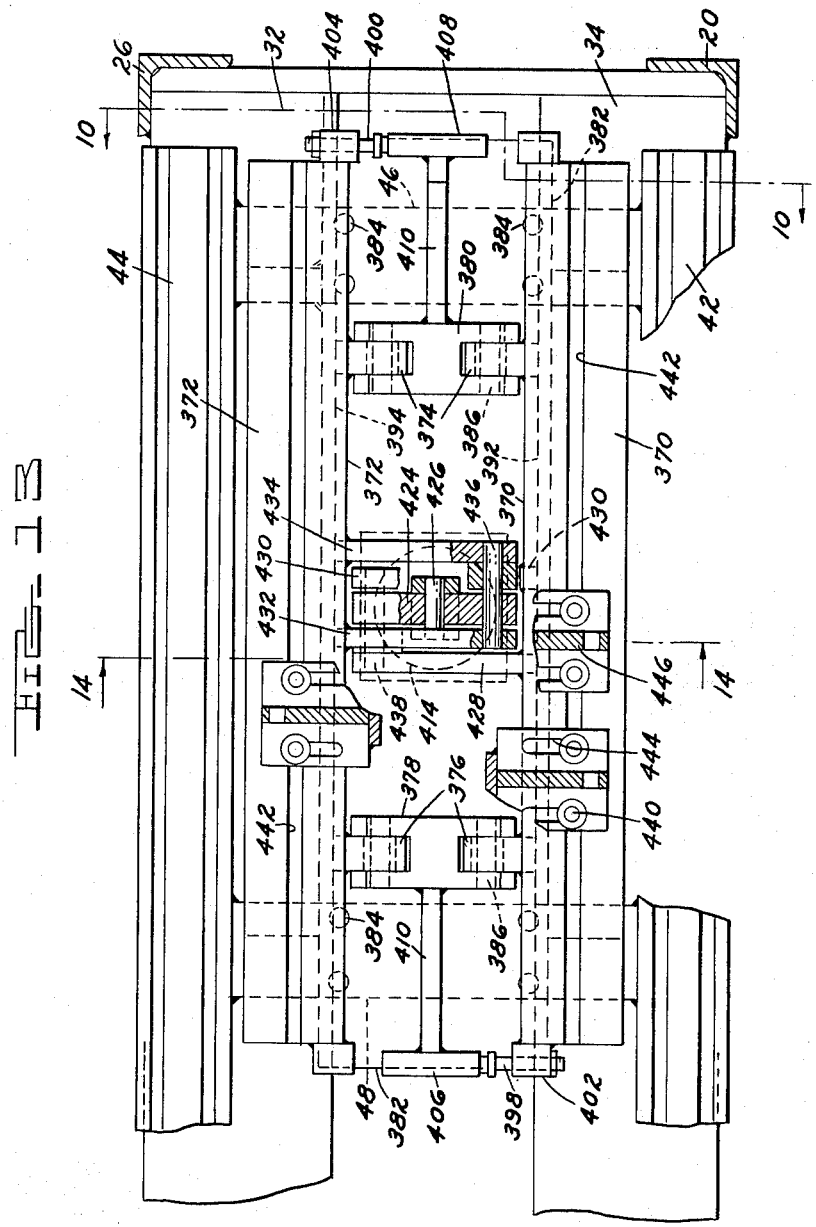

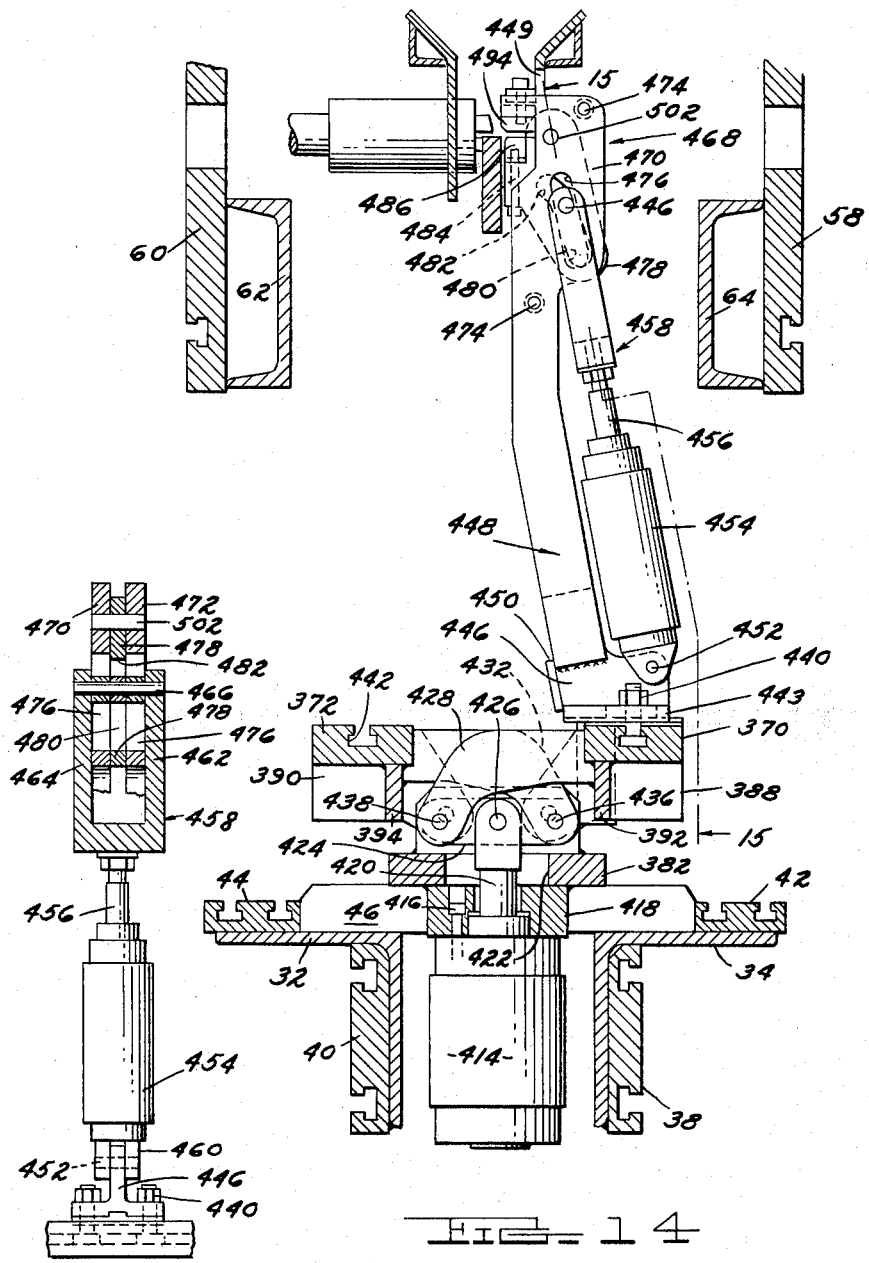
FIG_14
FIG_15
INVENTORS
AUGUST T. GONIA
HARRY H. FANTE
BY MITCHELL J. SHEPARD
Strauch, Nolan & Neale
ATTORNEYS

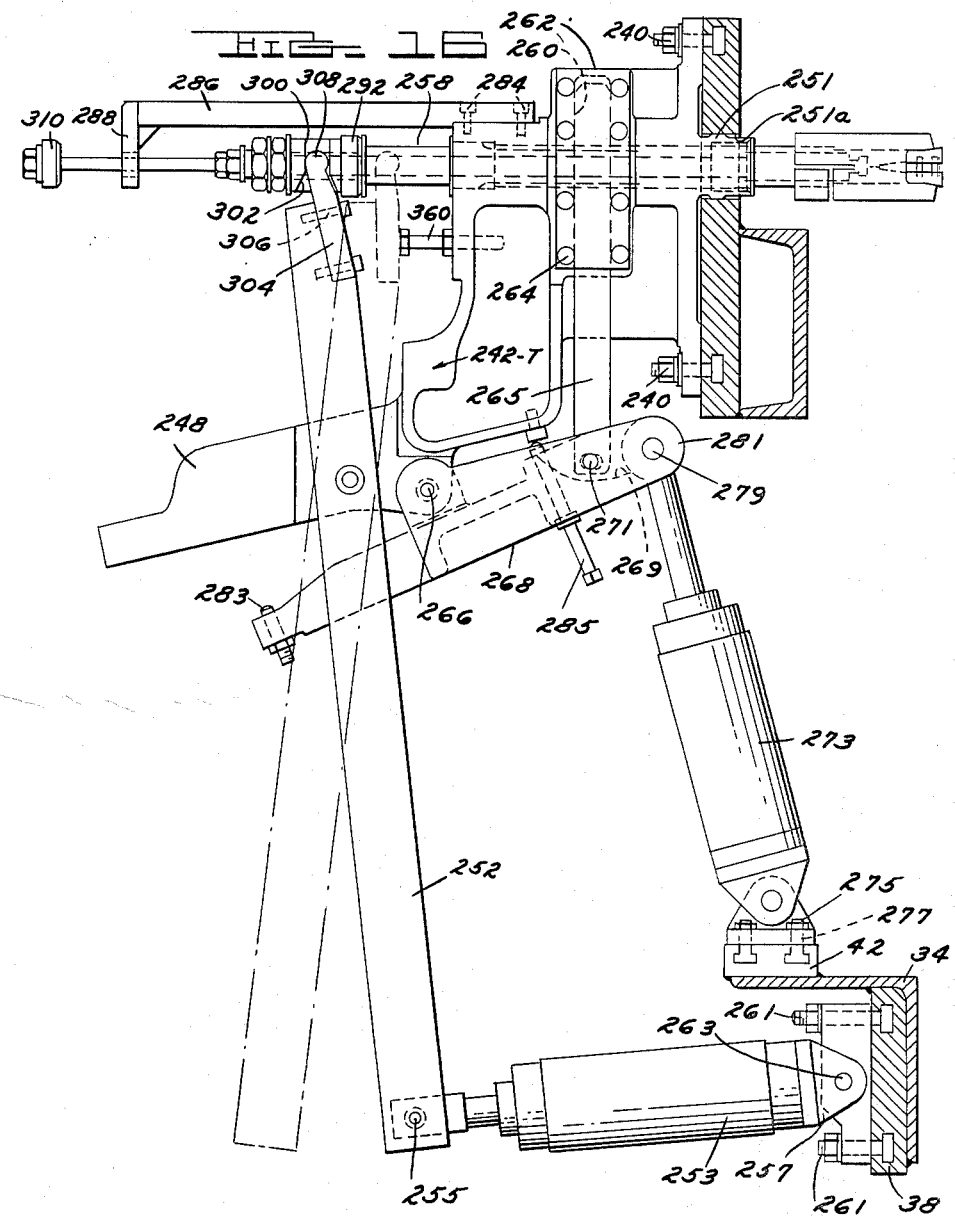

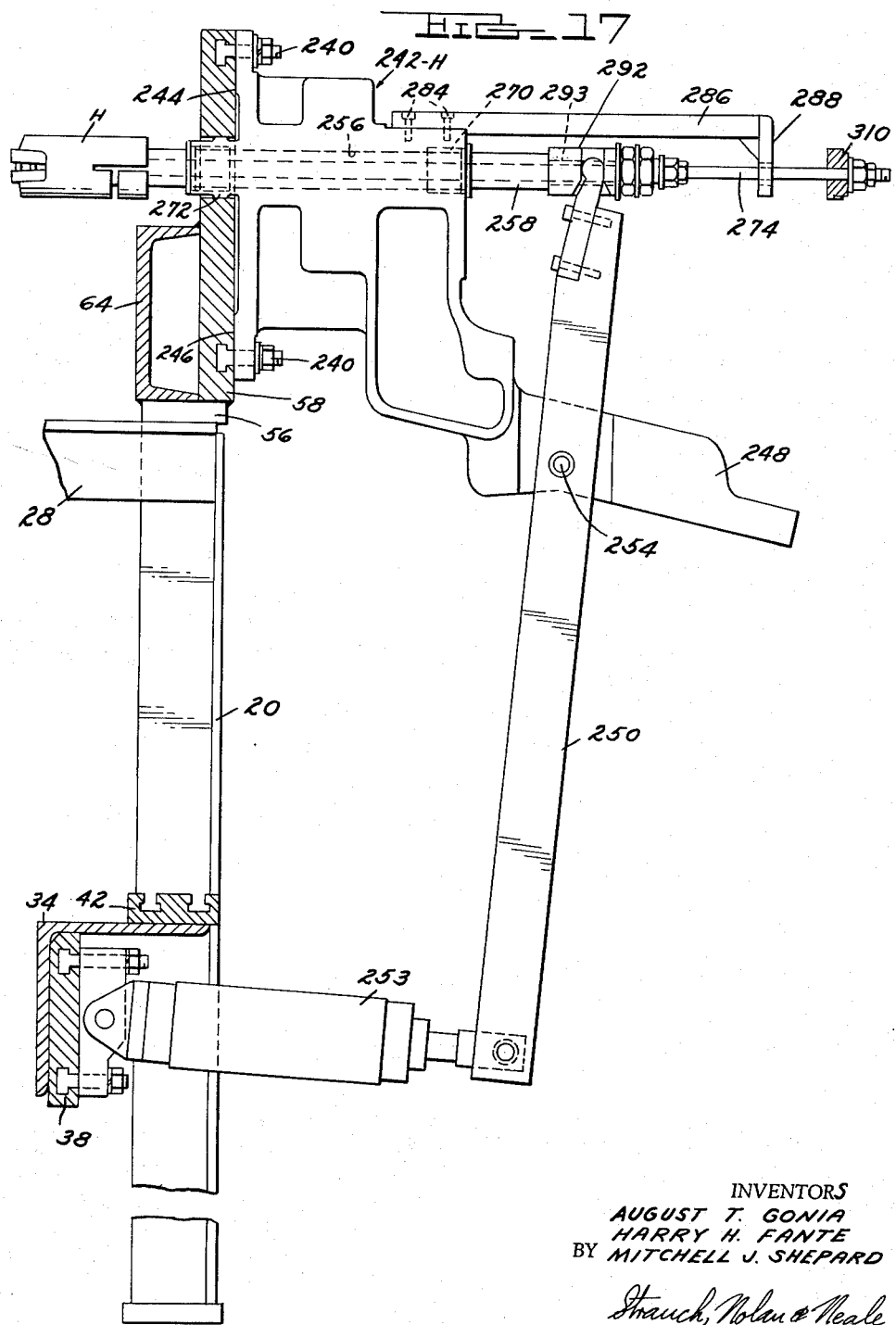

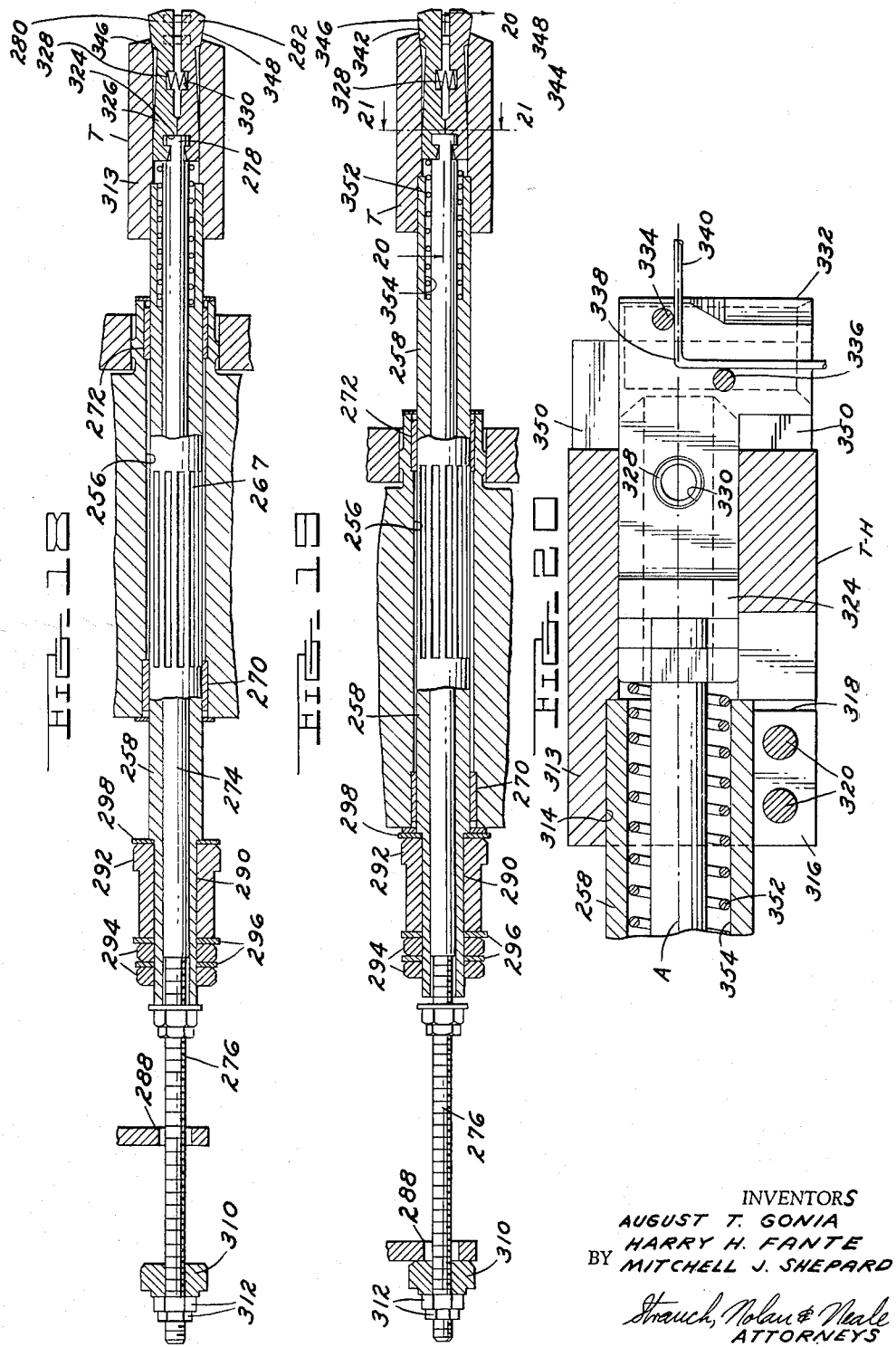

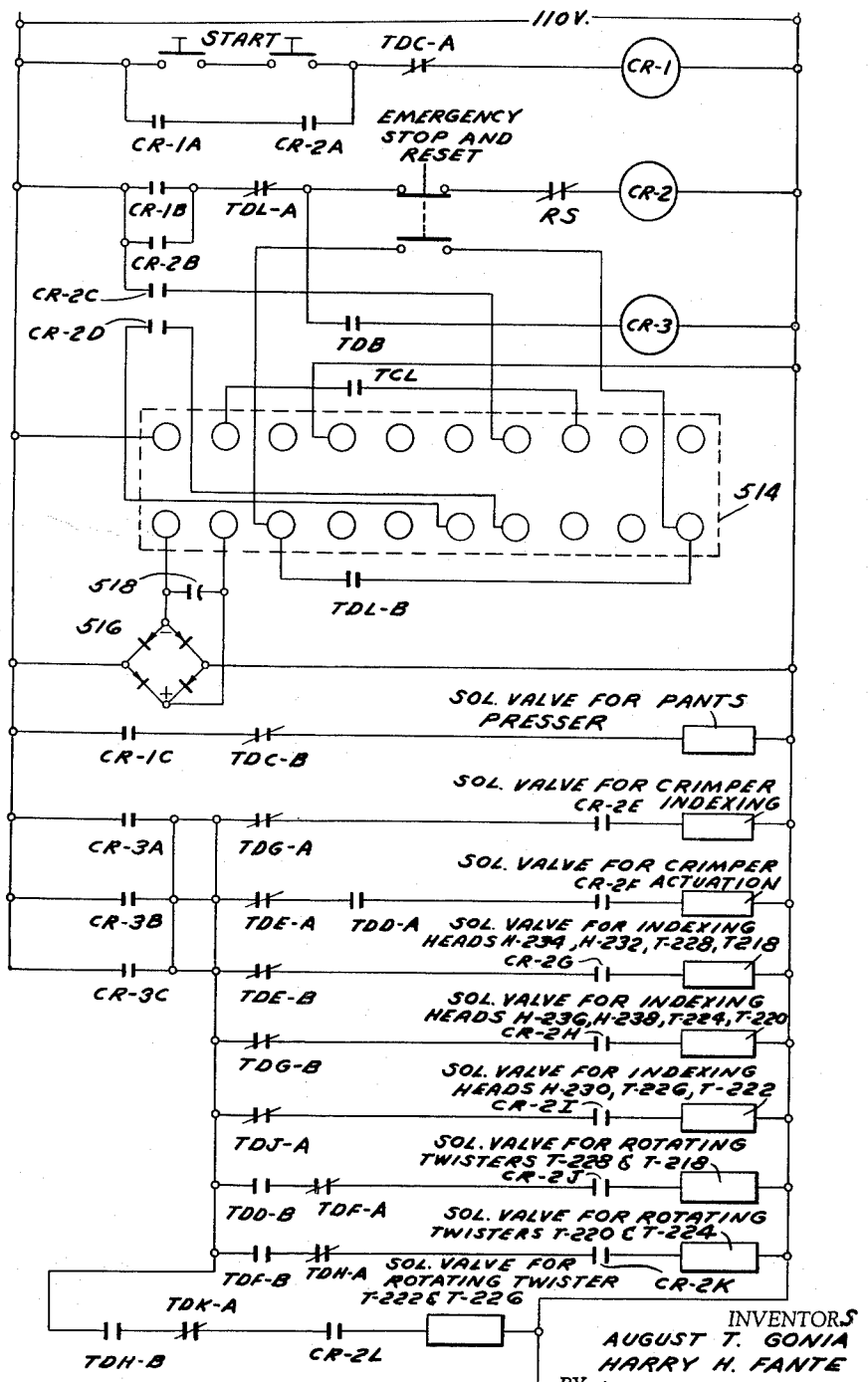

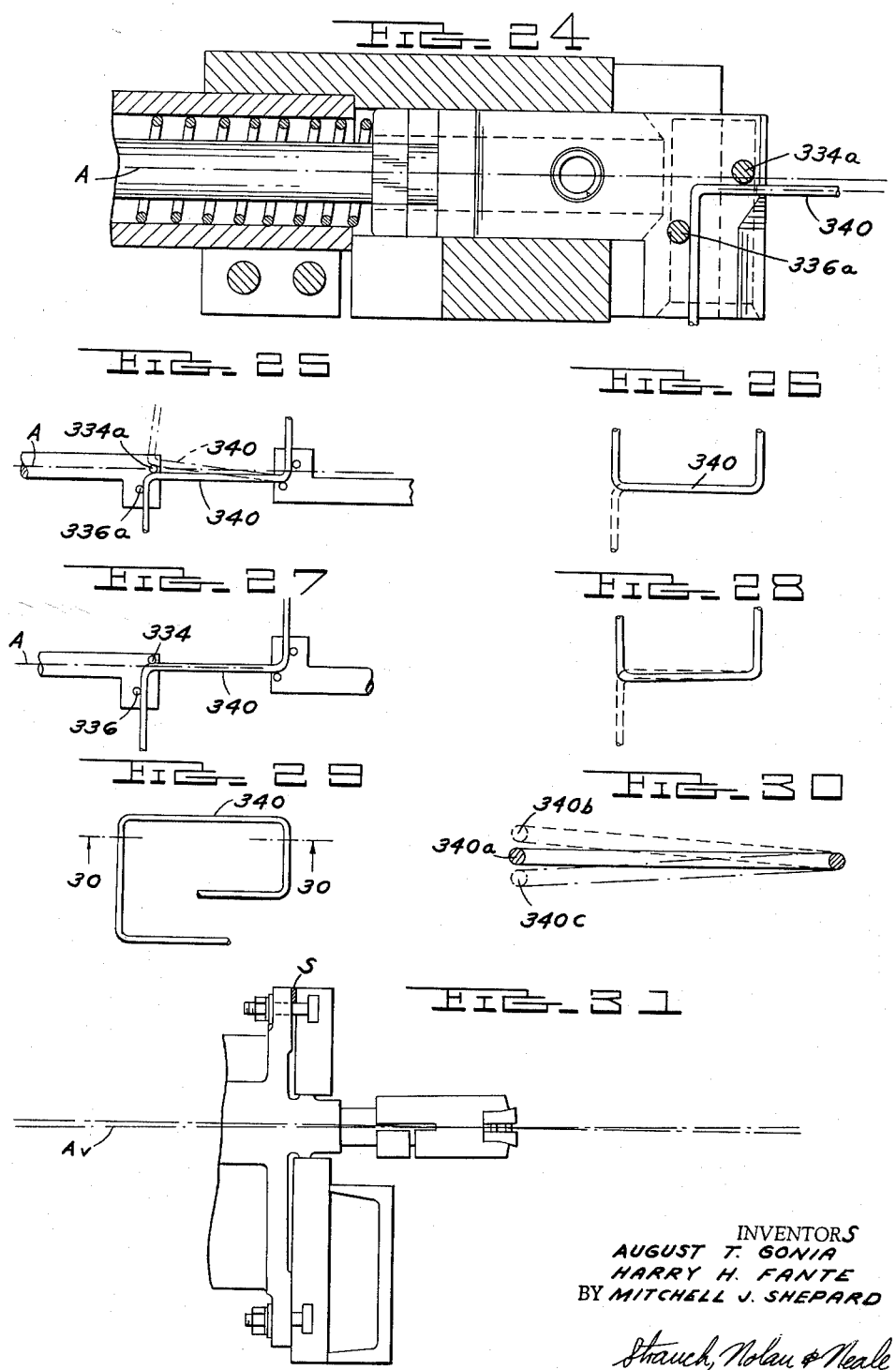

United States Patent Office 3,202,185
Patented Aug. 24, 1965

3,202,185
METHOD FOR BENDING SINUOUS STRIPS
August T. Gonia, Harry H. Fante, and Mitchell J. Shepard, Chicago, Ill., assignors, by mesne assignments, to Rockwell-Standard Corporation, a corporation of Delaware
Original application June 24, 1957, Ser. No. 667,432, now Patent No. 3,104,685, dated Sept. 24, 1963. Divided and this application Aug. 20, 1962, Ser. No. 224,882
8 Claims. (Cl. 140—71)

This is a division of Serial No. 667,432, filed June 24, 1957 which matured into U.S. Letters Patent No. 3,104,-685, on September 24, 1963.

This invention relates to a method of bending preformed formed wire strips into configurations adapted for use as springs in seat or back cushions for automobiles, furniture, or the like.

With the advent of what is termed "formed" wire, i.e., wire strips comprising non-uniform loops of substantially greater width than the loops of conventional zigzag strips and unequal spacing along the strips, such as is shown herein in FIG. 23, new approaches needed to be devised to bend the preformed wire strips into configurations for use as cushion springs. Heretofore various types of machines have been employed to bend preformed sinuous or corrugated wire sections, but for the most part the wire sections were of the conventional zigzag spring type. When the machines for bending preformed zigzag sections were employed to bend preformed formed wire sections of a wire diameter, for example, of .105", substantial undesirable distortion of the strips occurred.

Heretofore strips have been bent by twisting the straight wire loop-connecting portions about their axes. The formed wire strip before any bending is generally planar. To form a cushion spring the end portions are bent at an angle out of the plane of the strip to form supporting portions at each end of what may be termed a seating or resting portion. These supporting portions should lie at simple acute or obtuse angles with respect to the seating portion. However, the distortion above mentioned bends each supporting portion such that it assumes a compound angles with respect to the seating portion of the spring. This results from the loop adjacent the straight wire loop-connecting portion being twisted, opening or closing and thereby throwing the supporting portions angularly beyond the lateral edges of the strip out of alignment with the seating or resting portion of the strip. A loop opening in such fashion is shown in FIG. 28. An interesting phenomenon also observed has been that the distortion apparently is telegraphed along the wire section so that it is not only distorted at the point of the twisting of the wire but also at points spaced therefrom. In any event the distortion is undesirable for reasons understood in the art.

A primary object of the invention is the provision of a novel method of forming a preformed formed wire which will prevent the aforementioned undesirable distortions while simultaneously bending the wire sections to the desired shape for use as a seat or back cushion spring.

A further object of the invention is to provide a novel method of twisting the straight-wire loop-connecting portions of a preformed formed wire strip to prevent distortion of the strip which comprises forcibly gripping adjacent oppositely opening loops at opposite ends of the straight-wire portion to be twisted connecting such loops and rotating one of the loops about the axis of the straight-wire portion while holding the other loop stationary.

Another object of the invention is to provide a novel method of twisting the straight-wire loop-connecting portions of a preformed formed wire strip to prevent distortion of the strip which comprises forcibly gripping adjacent oppositely opening loops at the opposite ends of the straight-wire portion to be twisted connecting such loops, and holding one loop stationary while rotating the other loop about an axis parallel with but offset from the axis of the straight-wire portion, said offset being in a direction opposite to the distortion of the straight-wire portion which would occur if the loop was rotated about the axis of the straight-wire portion.

A further object of the invention is to provide a novel method of twisting the straight-wire loop-connecting portions of a preformed formed wire strip to prevent distortion of the strip which comprises forcibly gripping adjacent oppositely opening loops at opposite ends of the straight-wire portion to be twisted connecting such loops, and holding one loop stationary while rotating the other loop about an axis inclined to the plane of the strip, said inclination being in a direction opposite the distortion occurring if the straight-wire portion were twisted about an axis coplanar with the strip.

Other objects, advantages, and meritorious features will more fully appear from the following description, claims, and accompanying drawings wherein:

FIG. 1 (Sheet 1) is a front view of a wire bending machine embodying our invention;

FIG. 2 (Sheet 2) is a top view of the machine shown in FIG. 1;

FIG. 3 (Sheet 3) is a cross sectional view taken along the line 3—3 of FIG. 2;

FIG. 4 (Sheet 3) is a cross sectional view taken along the line 4—4 of FIG. 2;

FIG. 5 (Sheet 4) is a fragmentary cross sectional view looking down upon a wire section disposed in the machine with the wire twisting and holding heads extended to engage the wire;

FIG. 6 (Sheet 4) illustrates a wire section after successive bending operations thereupon;

FIG. 7 (Sheet 5) is a rear fragmentary view of a machine with parts broken away for clarity showing the wire strip positioning means;

FIG. 8 (Sheet 6) is a top view of the wire strip positioning means;

FIG. 9 (Sheet 7) is a cross sectional view taken substantially on the line 9—9 of FIG. 7;

FIG. 10 (Sheet 7) is a cross sectional view taken substantially on the line 10—10 of FIG. 13;

FIG. 11 (Sheet 5) is a front view of one of the wire crimping devices of the machine showing the crimping jaws shifted to crimp the wire;

FIG. 12 (Sheet 5) is a view similar to FIG. 11 but showing crimping jaws adapted to impart a crimp to a wire section in the reverse direction;

FIG. 13 (Sheet 8) is a cross sectional view taken on the line 13—13 of FIG. 1;

FIG. 14 (Sheet 9) is a cross sectional view taken on the line 14—14 of FIG. 13;

FIG. 15 (Sheet 9) is a cross sectional view taken on the line 15—15 of FIG. 14;

FIG. 16 (Sheet 10) is a side elevation of mechanism for axially shifting and rotating one of the wire twisting heads;

FIG. 17 (Sheet 11) is a side elevation of mechanism for axially shifting one of the wire holding heads;

FIG. 18 (Sheet 12) is a cross sectional view through one of the wire holding heads taken along the line 18—18 of FIG. 16;

FIG. 19 (Sheet 12) is a view similar to FIG. 18 but showing a wire twisting head extended to grip a wire section;

FIG. 20 (Sheet 12) is a cross sectional view taken on the line 20—20 of FIG. 19;

FIG. 21 (Sheet 4) is a cross sectional view taken on the line 21—21 of FIG. 19;

FIG. 22 (Sheet 13) is a schematic wiring diagram of the control circuit for the machine;

FIG. 23 is a plan view of a preformed formed wire strip adapted to be bent by a machine embodying the invention disclosed herein;

FIG. 24 is a cross sectional view through a wire-twisting head adapted to twist a straight wire loop-connecting portion about an axis displaced from the axis of such portion;

FIG. 25 shows the position of a straight wire loop-connecting portion before and after twisting thereof by the head shown in FIG. 24, and while the strip is engaged by the head and by a wire-holding head;

FIG. 26 shows the wire after it is removed from the heads of FIG. 25 following twisting of the straight wire portion;

FIG. 27 shows the twisting of a straight wire loop-connecting portion where the axis of rotation of the wire-twisting head is coaxially aligned with the axis of such portion;

FIG. 28 shows the results of twisting the straight wire loop-connecting portion according to FIG. 27 and showing the wire distorted;

FIG. 29 is a fragmentary view of an end of a seating or resting portion of a preformed formed wire strip where the same is bent to form the supporting portions;

FIG. 30 is a cross sectional view taken on the line 30—30 of FIG. 29 and showing the various positions the straight wire loop-connecting portion may assume before and after twisting to form the supporting portions; and FIG. 31 shows the axis of rotation of a wire-twisting head inclined with respect to the plane in which the wire strip is supported during bending thereof.

In FIG. 23 and in phantom outline in FIG. 6 are shown respectively the top and edge views of a preformed formed wire strip adapted to be bent by the method and apparatus herein described. The strip is bent to provide as shown in solid outline in FIG. 6, a seating or resting portion comprising loops $L_5$–$L_{10}$, inclusive, and supporting portions at opposite ends thereof comprising loops $L_1$–$L_4$, inclusive, and $L_{11}$, $L_{12}$, $L_{13}$, and E.

*General arrangement and operation*

In general, a machine for carrying out our invention includes a frame resting on the floor and provided with a horizontally disposed trough within which each wire strip to be bent is successively placed and after bending is removed therefrom. Supported below the trough on structural members of the frame are a plurality of fluid pressure motors adapted to impart the twists to the wire to bend the same. The motors are operatively connected to wire strip holding and twisting heads which are disposed at intervals along the length of the trough and are supported for movement into and out of the trough through the side walls thereof. The heads are retracted at the time a wire strip is placed in and removed from the trough and are extended to engage the wire when a strip is in the trough. The heads move in successively to engage a wire strip at intervals along its length and after they have gripped and twisted the wire they release the same and are retracted. The bent strip is thereupon removed from the trough and the next strip placed therein.

Means are provided for properly aligning the wire strip in the trough with the wire-holding and twisting heads to ensure that the strip is bent at the proper points along its length. Such locating means comprises what we term hereinafter a "pants presser," which is swung downwardly from a position above the trough to a position engaging the wire strip to locate the strip longitudinally in the trough. After the locating means locates the strip, then the wire-twisting and holding heads are successively actuated to bend the wire.

We have found it desirable and necessary in bending light-weight spring strips to forcibly grip the wire strips at the time of the bending thereof. To accomplish this, each wire-twisting and holding head may be provided with a pair of cooperating wire-gripping jaws which may be shifted apart to receive a portion of the wire strip therebetween and thereafter shifted toward each other to grip the strip during the bending operation. The jaws shift apart as the wire-twisting or holding head retracts away from a wire strip in the trough to release the strip, and move together as the head shifts toward a wire strip embracing the strip in the trough. During the movement of the heads toward the strip, the jaws remain open until they have fully embraced the wire and thereafter, while the remainder of the head continues to move, the jaws are urged together to forcibly grip the strip therebetween.

In addition to the wire twisting and holding heads which are arranged to engage the wire at intervals along its length, wire-crimping devices are provided. These crimping devices serve to impart bends to the strip at points lying in the bight of loops of the strip. The wire-twisting heads bend the strip by twisting straight wire loop-connecting portions while the crimpers bend the strip by bending bights of the loops.

In the operation of the machine, the operator places a wire strip to be bent in the trough of the machine and then the machine is actuated to shift the pants presser strip locater down toward the wire strip to locate the same. This movement of the locater initiates operation of the wire-twisting and holding heads which successively come in, grip, twist, and retract from the strip. The crimpers crimp the strip and after the wire-bending operation is completed, all wire-twisting and holding heads as well as the crimpers are retracted so that the operator may withdraw the wire strip from the trough.

*Machine frame*

The frame of the machine comprises four legs, 20, 22, 24, and 26, resting at their lower ends on the floor. Extending transversely of the frame between legs 20 and 26, and 22 and 24, adjacent the upper ends and at opposite ends of the machine, are angular bracing members 28 and 30 as shown in FIGS. 1 and 7, which may be welded or otherwise secured to the legs in any convenient fashion. Extending longitudinally of the frame and connected respectively to legs 20 and 22, and 24 and 26, are angular bracing members 32 and 34. These also may be fastened as by welding to the legs. Welded to the angle members 32 and 34 are longitudinally extending T-slotted members 38 and 40, as shown in FIG. 10. Mounted upon the upper faces of the horizontal flange of angle members 32 and 34 are longitudinally extending T-slotted members 42 and 44. Extending transversely of the frame between T-slotted members 42 and 44 and welded thereto are members 46 and 48. The members 38, 40, 42, and 44 carry the fluid pressure motors and related mechanism for shifting the wire-twisting and holding heads.

Extending longitudinally of the frame immediately thereabove, and welded upon pads 56 are T-slotted wire twister and holder carrying members 58 and 60. These are reinforced by welding to U-shaped members 62 and 64 as shown in FIGS. 9, 16, and 17. Bolts 66 secure the pads 56 to the cross members or braces 28 and 30.

Extending between reinforcing members 62 and 64 at the right-hand end of the frame as viewed in FIGS. 1 and 7 and welded thereto are structural members 68 and 70 tied together by inclined plates 72 as shown in FIGS. 7 and 9. At the left end of the frame complementary U-shaped members, 74 and 76, are welded together and extend between and are welded to reinforcing members 62 and 64. As shown in FIGS. 7 and 9, opposite ends of the T-slotted wire twister and holding plates 58 and 60 are reinforced by fillets 78 and 80 at opposite ends of the frame.

*Wire strip supporting trough*

Extending longitudinally of the machine along the center line thereof and on top of the frame is a wire strip receiving and supporting trough generally indicated in FIG. 2 at 82. The trough comprises a pair of side walls 84 and 86 and end walls 88 and 90, together with a bottom wall including bottom wall portions 96 and 110. The upper edges of the side and end walls are inclined outwardly as shown particularly in FIGS. 7 and 9 at 84', 86', 88', and 90'. The upper edges of the side walls may be reinforced by angle members 87 welded thereto as shown in FIG. 9. The side walls are provided with a plurality of apertures 89 therethrough through which the wire twisting and holding heads may reciprocate to engage a wire strip resting on the bottom wall portion 110.

The side walls 84 and 86 extend beyond the end walls as shown in FIGS. 3, 4, and 7, and are notched to seat upon transversely extending supports 92 and 94 which may be bolted as at 95 to the frame as shown in FIGS. 2 and 7. The side walls may be welded to the cross members. The bottom wall portion 96 is welded between the side walls 84 and 86 of the trough and is disposed spaced below the upper surface 110' of the bottom wall portion 110 as shown in FIG. 3. A pair of vertical walls 98 and 100 welded to the bottom wall portion 96 and to the side walls 84 and 86 form with the bottom wall portion 96 a well 102 into which the left-hand end of the strip may be swung during downward twisting of the left-hand end of the strip.

The bottom wall portion 110 extends longitudinally of the trough between the side walls 84 and 86 as shown in FIG. 2 and is supported at the right-hand end upon the cross member 94 as shown in FIG. 3. At the left-hand end of bottom wall portion 110, an L-shaped member 104 having the lower leg disposed horizontally and welded to the side walls 84 and 86 of the trough, supports the end of the bottom wall portion by welding as shown particularly in FIGS. 2 and 3. Spaced to the right of support member 104 is another L-shaped support 106 welded to wall 84 of the trough and to the bottom wall portion 110 as shown in FIGS. 5 and 9. Spaced to the right of member 106 is plate 108 also welded to side wall 84 and to the bottom wall portion 110. Adjacent the right-hand end of bottom wall portion 110 a pair of supports 112 and 114 are welded respectively to the side walls 84 and 86 of the trough and to bottom wall portion 110 as shown in FIGS. 2 and 5. Another support for the bottom wall portion 110, shown in FIGS. 2-4 at 116, is welded to side wall 86 and to bottom wall portion 110. To the right of support 116 is another support 118 also welded to side wall 86 and to the bottom wall portion 110. Bottom wall portion 110 is cut away as at 120, 122, 124, 126, 128, 130, 132, 134, and 136 to permit the wire-twisting and holding heads to extend into the trough to grip the wire. The relationship of cutouts 120 and 122 in relation to the wire-twisting and holding heads is shown in FIG. 9.

The trough is also provided with wire-positioning pads which center the wire strip accurately between the side walls 84 and 86 of the trough. The relationship of these pads to the wire strip is shown in FIG. 5. The pads are disposed to abut bight portions of the strip. Two pads are shown though more may be provided if necessary to locate the strip. Such pads comprise upstanding portions 104a, 106a, respectively, of L-shaped supports 104 and 106. The upper edge of each pad may be beveled as at 106' as shown in FIG. 9 with respect to pad 106.

Upon placement of a wire strip in the trough, the bottom wall portion 110 supports the strip and the pads 104a, 106a, and 142 center the strip in the trough. The left-hand end of the strip may be temporarily supported by a spring-loaded finger 146 shown in FIGS. 2-4. Upon downward twisting of the left-hand end of the wire the spring tension of the finger is overcome, permitting the wire to swing downwardly. However, the weight of the left-hand end of the wire strip is not sufficient to overcome the spring tension of the finger so that the finger supports the strip prior to the twisting thereof.

*Wire strip locator*

Following placement of a wire strip in the trough 82 the pants presser wire strip locator L swings down into the trough from an at-rest position disposed thereabove and rearwardly to accurately locate the strip longitudinally in the trough so that the wire-twisting and holding heads, when extended in to grip the wire strip, will grip the strip at the proper points along its length. It is important that the strip be accurately located longitudinally because, during the twisting of the strip, the wire-twisting heads twist the straight wire loop-connecting portions and in order to correct for distortion of the strip during twisting, the straight wire loop-connecting portions must be accurately located in relation to the axes of rotation of the twister heads. In the embodiment of the invention herein disclosed, an electric switch in the control circuit for the machine, as hereinafter described, is manually actuated by the operator of the machine after the strip has been placed in the trough. Upon actuation of this switch the locator swings down, positions the straight wire loop-connecting portion, certain of the wire-twisting and holding heads extend into the trough and grip the strip and thereafter the wire locator swings upwardly back to its at-rest position. With the wire locator in the at-rest position, the wire-twisting heads then twist the wire.

The wire locator is shown in FIGS. 1, 7, 8, and 9 and includes a fluid pressure motor 150 secured to the frame of the machine and operatively coupled with a lever arrangement 152 which carries at its outer end a locating member 154 having a plurality of depending downwardly opening V-blocks or blades 156 individually identified by suffix letters *a–e*, each adapted to receive a straight wire loop-connecting portion of the wire strip in the trough. The working position of the locator is shown in FIG. 9 and it will be understood that upon operation of motor 150 to swing the locator to the at-rest position, the lever arrangement 152 will be swung upwardly and away from the wire strip-receiving trough.

The locator is secured to the T-slotted plate 58 as shown in FIGS. 1, 7, and 9. The plate is provided with longitudinally extending T-shaped slots 158 and 160 which are disposed in vertically spaced relation along the upper and lower edges, respectively, of the plate and correspond with similar slots 162 and 164 in plate 60. These T-slotted plates 58 and 60 serve to support the wire-twisting and holding heads and the wire locator, as well as the wire-crimping devices, for relative adjustment along the length of the machine, whereby the machine may be readily accommodated to bend wire strips at any desired points along their lengths. This adjustability is extremely important in order to enable the machine to bend different batches of wire strips each having different spring characteristics requiring bends at differing points along the lengths of the strips of each batch.

The locator includes a pair of vertically extending plates 166 and 168 as shown in FIGS. 1, 7, and 9, which are secured by bolts 170 to the plate 58 with the heads of the bolts received in the T-slots 158 and 160. Welded or otherwise secured to each of the plates 166 and 168 is an outwardly extending ear 172 and 174 upon which is pivotally supported a pair of generally U-shaped arms 176 and 178, as shown in FIGS. 1 and 8, comprising the arm arrangement 152. The arms are supported on the ears by means of pins 180 and 182 which are welded to the arms and received in bearings 184 in the ears. A bracing member 186 extends between the arms and is welded thereto as shown in FIG. 8 with an actuating lever 188 welded to the bracing member. The piston rod 190 received within the cylinder 192 of the fluid pressure motor 150 serves to swing the arm assembly from an at-rest position to the working position shown in FIG. 9 upon pressurization of motor 150. The piston rod is provided with a bifurcated end portion 194, the ears of which are received on opposite sides of the actuating member 188 with a pivot pin 196 extending through the ears and the actuating member. The lower end of the motor is supported on an ear 198 which extends outwardly from and is welded to a vertically extending plate 200 secured by bolts 202 to the T-slots of plate 58 as shown in FIG. 1 and 7. The lower end of motor 150 is provided with a bifurcated portion 204 the ears of which are received on opposite sides of ear 198 with a pin 206 extending through the ears.

The V-blade carrying member 154 at the outer ends of arms 176 and 178 extends longitudinally of the trough when swung to the working position and may be tubular in cross section as shown in FIG. 9 and received through provided holes in the outer ends of the arms and welded thereto as shown in FIG. 8. A depending skirt 208 welded or otherwise secured to the member 154 extends along the length thereof and carries the depending V-blades 156. The skirt or flange terminates just above the wire strip supporting floor 110 when the arms are swung to the working position as shown in FIG. 9. The V-blades, which are shown in FIG. 7, are of generally rectangular shape and each is provided with a downwardly opening V-groove 210 which, at its apex, opens into a parallel wall slot 212 adapted to slidingly receive the straight wire loop-connecting portions of the strip. The V-shaped mouth of each blade serves to guide the straight wire loop-connecting portion of the strip into the slot as the locator comes down over the strip in the trough. Each locator may be secured to the skirt by means of flat-head screws or the like 214. The spacing apart of the V-blades along the skirt may be varied by drilling and tapping additional holes for the flat-headed screws.

It will be appreciated that not only do the V-blades of the locator serve to accurately position the wire strip longitudinally in the trough but also accurately position the straight wire loop-connecting portions of the strip relative to each other. At the right-hand end of the locator skirt, as viewed in FIG. 7, an additional positioning blade 216 is provided, which cooperates with a locating block 217 secured to end wall 90 of the trough to locate the right-hand end of the strip. The cutout portions 122 and 132 in the wire strip-supporting bottom wall 110 of the trough permit the locating V-blades to extend down and engage the wire without interference by the bottom wall, as shown in connection with V-blade 156c and cutout 122 in FIG. 9.

Wire strip distortion

In attempting to bend preformed formed wire strips using machines designed to bend conventional zig-zag strips, we found that undesirable distortion of the formed wire strip resulted, particularly in attempting to bend lightweight spring wire of a diameter approaching .105″. In bending a sinuous strip of wire it is the practice to twist the straight wire loop-connecting portion extending between an adjacent pair of oppositely opening loops. This is accomplished by engaging the loops with a wire-twisting head at one edge of the strip and a wire-holding head at the opposite edge of the strip, and rotating the twisting head. The heads are usually slotted in the plane of the strip with the loops received in the slots.

A phenomenon observed was that as we twisted a straight wire loop-connecting portion of the formed wire strip, the twisting was apparently telegraphed along the strip causing distortion thereof at one or more points spaced from the straight wire loop-connecting portion intentionally twisted. We discovered that this distortion could, in many instances, be eliminated if the intentional twisting of the strip could be restricted to the single straight wire loop-connecting portion extending between the wire-twisting head and the wire-holding head at opposite edges of the strip.

We observed that during the twisting of the straight wire loop-connecting portions, the wire within the slots of the twisting and holding heads seemed to roll or twist around the axis of wire and follow the bight portions of the loops, and thereby telegraphed along the strip. In other words, not only would a straight wire loop-connecting portion intended to be twisted, twist under the rotation of the twisting head, but this twisting was telegraphed into the bight portions of the loops.

We discovered that to a great extent this distortion could be prevented by forcibly gripping the wire strip during the twisting of the straight wire loop-connecting portions thereof. By forcibly gripping the wire, the twist imparted thereto by the twisting heads was localized in the straight wire loop-connecting portion intended to be twisted and was not permitted to telegraph along the strip.

However, simply forcibly gripping the strip did not in every instance serve to completely eliminate distortion. After experimentation we discovered that if the straight wire loop-connecting portions were eccentrically twisted this would in many instances correct the distortion. Consequently one or more of the wire-twisting heads disclosed in the machine are adapted to twist the straight wire loop-connecting portions of the strip eccentrically rather than merely twisting about the axis of the straight wire loop-connecting portions.

In FIG. 20 we have shown a cross sectional plan view through a twister head adapted to twist the straight wire loop-connecting portion about the axis of such portion. In FIG. 24 we have shown a wire-twisting head adapted to eccentrically twist a straight wire loop-connecting portion. Such eccentric motion is described more particularly hereinafter.

Even forcibly gripping and eccentrically twisting the wire did not always completely eliminate objectionable distortion. It was discovered also necessary to incline the axis of rotation of the twisting head to the plane of the strip. Employing one or more of these three techniques, it was found that the preformed formed wire strips could be bent without introducing undesirable distortion.

Supporting mechanism for wire twisting and holding heads

As hereinbefore mentioned, the machine includes a plurality of wire-twisting and holding heads arranged along opposite sides of the wire strip-receiving trough and adapted to reciprocate through apertures in the side walls of the trough to engage a strip disposed therewithin. As shown in FIG. 5, the machine includes wire-twisting heads T-218, T-220, T-222, and T-224, all on one side of the trough, and T-226 and T-228 on the other side of the trough. Also wire-holding heads H-230 and H-232 are disposed on one side of the trough and H-234, H-236, and H-238 are disposed on the opposite side of the trough. It will be understood that the arrangement and number of wire-twisting and holding heads shown in FIG. 5 is merely exemplary, the arrangement being to bend a wire strip to the configuration shown in FIG. 6.

The wire-holding and twisting heads are supported for reciprocal movement, or indexing, from an at-rest position disposed spaced from a wire strip in the trough to a wire-gripping position wherein the jaws of the heads embrace a wire strip in the trough. The wire-twisting heads are also supported for rotation such that after gripping the wire, rotatable movement of the heads will effect a twisting of the wire. All the twisting heads except head T-222 serve to twist the straight wire loop-connecting portions of the strip. Twisting head T-222 bends the strip in the bight of one of the loops of the strip.

The wire-twisting and wire-holding mechanisms are of similar construction for the most part, differing only in that the wire-twisting mechanisms include means for rotating the associated wire-gripping heads while the wire-holding mechanisms are provided with means preventing rotation of the associated wire-gripping heads. Therefore, in the following description similar reference numerals and description common to both types of mechanism will be employed up to the points of difference in the respective mechanisms.

Referring to FIGS. 1, 16, and 17, the general arrangement of the wire-twisting and holding-head mechanisms is shown. An exemplary wire-holding-head mechanism is shown in FIG. 17 while an exemplary twisting-head mechanism is shown in FIG. 16. It will be understood that the mechanism shown in FIGS. 16 and 17 is duplicated for each wire-twisting and holding head mechanism in the machine. The wire-twisting and wire-holding mechanisms are connected to the machine frame for shiftable movement longitudinally therealong on the plates 58 and 60, being held thereon by bolts 240 received in the T-slots of plates 58 and 60. Each such mechanism includes a bracket generally indicated at 242, the wire-twisting brackets being specifically identified at 242–T while the holding-head brackets at 242–H, and each bracket includes a face having an upper and a lower flatted portion 244 and 246 overlying plates 58 and 60, and between which and the surface of the plate abutted by the support, shims S, see FIG. 31, may be inserted to vary as desired the angle of inclination of the axis of rotation of the twisting heads with respect to the plane of a wire strip supported in the trough. The desirability of inclining the axis of rotation of the twisting heads to correct for distortion of the strip will be further mentioned.

Each bracket 242–T and 242–H is shaped as shown in FIGS. 16 and 17 to include a tail portion 248 upon which is pivotally supported a vertically extending pair of levers 250 and 252, the levers being supported upon a pin 254 received through the tail. The levers serve to transmit a reciprocating motion to the wire-twisting and holding heads from a fluid pressure motor associated with each twisting- and holding-head mechanism. The bracket is also provided with a bore 256 in which is received the head-supporting spindle assembly of the twisting or holding head as the case may be. The levers 250 and 252 are operatively connected to the spindle assembly to reciprocate the heads. The brackets include a locating portion 251 which extends through longitudinal slots 251a in the plates.

The wire-twisting head bracket 242–T shown in FIG. 16 in addition to the foregoing includes a rack bar-receiving channel 260 opening into bore 256 and closed by a cover plate 262 which is secured by bolts 264 to the bracket. The bracket also includes an aperture for the reception of a pivot pin 266 for swingably supporting a rack bar actuating arm 268.

The spindle assembly for supporting the wire-twisting and wire-holding heads includes an outer sleeve portion 258 shown in FIGS. 16–20 which is supported for movement in bearings 270 and 272 in opposite ends of the bore 256 in the supporting brackets. In the case of the wire-holding heads, the bearings support the sleeve for reciprocal movement while in the case of the wire-twisting head sleeves, the bearings support the sleeves for both reciprocal and rotatable movement.

Extending axially through each sleeve 258 is a long, jaw-actuating rod 274 threaded at its rear end as at 276. The rod is supported within the sleeve for reciprocal movement relative thereto and for movement therewith. At the forward end the rod is provided with a T-shaped head portion 278 which is adapted to engage the wire-gripping jaws 280 and 282 for a purpose hereinafter described.

Secured by bolts 284 to the brackets 242 to extend rearwardly therefrom is an L-shaped stop member 286 having a depending apertured end 288 through the aperture in which the actuating rod 274 extends. This stop serves to limit shifting of the actuating rod toward a wire strip disposed in the trough during movement of the spindle assembly toward the trough.

The rear end of each sleeve 258 has a reduced diameter portion 290 upon which is received a coupling sleeve 292. The coupling sleeve 292 in each spindle assembly for a wire-twisting head is rotatably supported on the reduced diameter portion 290 of the sleeve 258, while in the case of the spindle assemblies for the wire-holding heads the coupling sleeve is keyed as at 293 to the sleeve 258. Threaded on the reduced diameter portion 290 are a pair of locking nuts 294 spaced from each other and from the coupling sleeve 292 by washers 296. The coupling sleeve is spaced from the rearwardly facing shoulder of the reduced diameter portion of sleeve 258 by a washer 298. The coupling sleeve is provided at opposite sides, as shown in FIGS. 16 and 17, with slots 300 having V-opening mouths 302.

The upper ends of each pair of spindle indexing arms 250 and 252 are fixedly held against relative shiftable movement by a plate 304 secured to the arms by bolts 306. Each plate is provided with a pair of spaced-apart ears 308 adapted to embrace the actuating sleeve 292 and be received within the slots 300 therein. The upper end of each ear 308 is rounded as shown in FIG. 16 so that the ear may rock relative to the actuating sleeve. In the case of the spindle assemblies for the holding heads, such as the one shown in FIG. 17 having a keyed connection between sleeves 292 and 258, the ears 308 prevent rotation of the coupling sleeve 292 and in turn rotation of sleeve 258. It is now apparent that upon swinging of arms 250 and 252 the spindle assemblies will be reciprocated in the supporting brackets 242–H and 242–T.

The head-carrying spindle assembly is reciprocated by a double-acting fluid pressure motor 253 having a piston rod connected as at 255 between the indexing arms 250 and 252 of each pair of arms. The motor is provided with a bifurcated part 257 secured to the end thereof with the ears of the bifurcated part embracing a pivot block 259 bolted as at 261 to the T-slotted plates 38 and 40. The bifurcated part is pivotally connected to the block by a pivot pin 263. The block is adjustable along plate 38 to keep the block in alignment with bracket 242–H or 242–T in the event the latter is adjusted.

The sleeve 258 of each twister spindle assembly is rotated by rack bar 265, the teeth of which mesh with teeth 267 on the sleeve, upon reciprocation of the rack bar. The rack bar extends into a recess 269 in arm 268 and a pin 271, received through an elongated hole in the rack bar and secured in the sides of recess 269, transmits the motion from the arm to the bar. The arm is swung by a double-acting fluid pressure motor 273 pivotally connected, in a fashion similar to motor 253, with a pivot block 275 adjustably secured by bolts 277 to the T-slotted plates 42 and 44. The piston rod of the motor 273 is pivotally connected by pin 279 between ears 281 of the bifurcated end of the arm 268. Adjustable stops 283 and 285 limit swing of the arm.

*Wire gripping heads*

Mounted on the inner end of each spindle assembly is a wire-gripping head indicated in the drawings as T or H depending upon whether it is, respectively, either a twisting or a holding head. Because the wire-gripping head is the same except as hereinafter mentioned, whether it be used as a twisting head or as a wire-holding head, it will be understood that the following description is applicable to either a wire-twisting or wire holding head such as T–218 or H–230 shown in FIG. 5. As shown in FIGS. 18–20, the head includes two cooperating units: a chuck 313 and a pair of coacting wire-gripping jaws 280 and 282. The chuck is generally cylindrical and provided with a bore 314 within which is received the inner end of the sleeve 258. The chuck is provided with a longitudinally and radially extending slot opening from the bore 314 outwardly of the chuck as shown at 316 in FIG. 20. This slot terminates in a transverse radial slot 318. The slots 316 and 318 provide a clamp for tightening the chuck on the sleeve 258 by means of bolts 320, the shanks of which are shown in FIG. 20. Upon tightening of the bolts the chuck is securely locked upon the sleeve 258.

As shown in FIGS. 19, 20, and 21, the chuck is interiorly provided with a generally rectangular, axially extending bore 322 within which are received the cooperating wire-gripping jaws 280 and 282 hereinbefore mentioned. Each jaw has a generally rectangular shaped body portion 280a and 282a which lock the jaws against rotation relative to the chuck, as will be apparent from a consideration of FIG. 21. The jaws are provided with a rocking surface at the interfaces 324 as shown in FIGS. 18 and 21. Immediately rearward of the interfaces the jaws are slotted to cooperatively provide a T-slot 326 within which is received the T-shaped head 278 at the inner end of actuating rod 274. The jaws are urged apart by a spring 328 received in recesses 330 in each jaw.

Each jaw is generally T-shaped in plan view as shown in FIG. 20 having an offset thread portion 332. Wire loop-locating pins 334 and 336 fixedly secured in one of the jaws and received within co-operating slots in the other jaw serve to position the loop 338 of a wire strip in proper position within the jaws for gripping thereby. In the case of the use of the gripping head as a wire twister, the pins 334 and 336 may either be located as shown in FIG. 20 to align the transverse loop-connecting portion 340 of the strip with the axis A of rotation of the head, or may be located as shown at 334a and 336a in FIG. 24 to displace the transverse loop-connecting portion 340 from the axis of rotation of the head. In the latter instance the effect is to eccentrically twist the straight wire loop-connectign portion to correct for distortion which would otherwise occur.

It will be noted that the generally square bore 322 in the chuck terminates in outwardly tapering camming surfaces 342 and 344 which abut tapering surfaces 346 and 348 of the jaws. With the provision of the cooperating tapering surfaces 342-348 it is apparent that upon relative axial shifting of the chuck and jaw units, the jaws will be opened or closed upon a wire loop disposed between the jaws. More specifically, upon shifting of the jaws to the left relative to the chuck, as shown in either FIG. 18 or 19, the jaws will be urged together to grip a wire strip disposed therebetween, and upon relative shifting of the jaws to the right or outwardly of the chuck, the spring 328 will urge the jaws apart to release a wire strip disposed therebetween. It will be noted that the chuck is cut away as at 350 to permit the relative shifting between the chuck and the jaw units when the offset portion 332 of the jaws is either in the position shown in FIG. 20 or if the jaws are rotated 180° relative to the chuck.

The jaws are urged outwardly to the open position by cooperation of spring 328 and a spring 352 received in a counterbore 354 in the sleeve 258. The spring 352 bottoms against a shoulder of the counterbore as shown in FIGS. 18 and 19 and bears at its outer end against the rear faces of body portions 280a and 282a of the jaws. With the provision of spring 352 the jaws and actuating rod 274 are yieldingly urged to the right of sleeve 258 and chuck, thereby permitting the spring 328 to open the jaws.

The jaws may be provided with a small notch 354, see FIG. 20, which indicates to the mechanic setting up or adjusting the machine, the location of the straight-wire loop-connecting portion 340 when a loop is received in and gripped by the jaws. It is important to know the relative position of the straight-wire loop-connecting portion so that the wire-gripping heads at opposite sides of the wire strip may be properly positioned relative to each other. For example, in FIG. 5, notches 354 are shown in heads T-226 and H-230 and in setting up the machine, the notches of the heads are located directly opposite each other. By so locating the heads, the pins 334 and 336 are accurately located relative to each other between the two heads.

In bending the preformed wire strip shown in FIG. 23, the transverse loop-connecting portions, or what may be termed straight-wire loop-connecting portions, are twisted. In FIG. 23 the loops are identified as $L_1$ through $L_{13}$, there being a short end E at the right-hand end of the strip. The straight-wire or torsion bar portion connecting loops $L_1$ and $L_2$ will be referred to as $L_1$–$L_2$, that connecting loops $L_5$ and $L_6$ as $L_5$–$L_6$, etc. To bend the strip into the final shape shown in solid outline in FIG. 6, straight-wire portions $L_1$–$L_2$, $L_3$–$L_4$ are twisted downwardly, while straight-wire portions $L_4$–$L_5$, $L_{10}$–$L_{11}$ and $L_{13}$–E are twisted upwardly. The bight portions of loops $L_6$, $L_7$, $L_8$, and $L_9$ are bent or crimped as hereinafter explained.

In twisting these straight-wire loop-connecting portions, such as $L_1$–$L_2$, twisting-head T-218, see FIG. 5, embraces loop $L_1$ while holding-head H-234 embraces loop $L_2$. Head T-218 then rotates to twist $L_1$–$L_2$. With the jaws of the heads forcibly clamping the loops, the twisting is predominantly confined to the portions $L_1$–$L_2$ and the wire cannot roll between the jaws to telegraph any appreciable twist into the bight of loop $L_2$ and thereby distort loop $L_2$. However, in twisting straight-wire portions $L_3$–$L_4$, $L_4$–$L_5$, or $L_{10}$–$L_{11}$, simply clamping the jaws forcibly about the loops frequently is insufficient to prevent distortion. This is in part of the result of the straight-wire loop-connecting portions being twisted farther than portion $L_1$–$L_2$, and is also dependent on the gauge of the wire being twisted, the length of the straight-wire portion, and various other factors. Examples of distortion that may sometimes creep into the strip even though the jaws clamped the strip, are shown in FIGS. 28 and 30. One method of correcting the distortion is to eccentrically twist the straight-wire portions instead of simply twisting them on their axes.

In FIG. 27 a holder and twister are schematically shown with the locating pins 334 and 336 positioning the axis of the straight-wire portion 340 on the axis A of the twister. Upon rotation of the twister, the wire is twisted from the solid outline position of FIG. 27 to the solid outline position after release of the wire by the twister shown in FIG. 28. It will be noted that the solid outline of the connecting portion 340 in FIG. 28 is not parallel with its original axis shown in dotted outline but is distorted. If this straight-wire portion was at the location of straight-wire portion $L_4$–$L_5$ in FIG. 23, the end of the strip to the left of $L_4$–$L_5$ would be thrown laterally out of alignment with the rest of the strip. Because this distortion occurs in the plane of the strip, it may be termed planar distortion. In other words, the straight-wire portion being twisted is thrown out of parallelism with the other straight-wire portions in the plane of the strip.

To correct planar distortion the loop-connecting portion being twisted may be twisted eccentrically by offsetting the axis of twisting from the axis of the loop-connecting portion. This is shown in FIG. 25 wherein the locating pins 334a and 336a are so disposed in the jaws of the head that they position the loop such that the straight-wire portion 340 is displaced in the plane of the strip from the axis A of rotation of the head. The amount by which the axis of rotation is displaced may be substantially equal to or greater than the amount by which the straight-wire portion would be distorted if twisted on its own axis as shown in FIG. 27, and of course the displacement is in a direction opposite the distortion.

For example, the twisters in both FIGS. 25 and 27 rotate in the same direction. Twisting by the head in FIG. 27 leaves the straight-wire portion distorted toward the bottom of the page. Consequently, to correct for this, the twister in FIG. 25 is positioned with its axis A of rotation "above" the straight-wire portion so that upon completion of the twisting and before removal of the jaws, the loop-connecting portion is shown temporarily distorted in dotted outline. However, upon removal of the jaws and retraction of the twister, the loop-connecting portion springs back to the solid outline position shown in FIG. 26.

Another type of distortion sometimes occurring may be termed non-planar distortion. This distortion is the result of a loop-connecting portion being thrown out of the plane of the strip. For example, in FIG. 29, which is a view looking down perpendicularly toward the plane of a strip at a pair of adjacent loops connected by portion 340 which has been twisted, while the loop-connecting portions appear parallel in this view, view 30 will show that portion 340 may, nevertheless, be distorted. At 340a in FIG. 30, the loop-connecting portion is in perfect planar alignment with the remainder of the strip. At 340b and 340c the loop-connecting portion is distorted or tilted out of the plane of the strip. To correct this non-planar distortion the axis of rotation of the wire twister is inclined to the plane of the strip as shown in FIG. 31. This is accomplished by shimming the twister-supporting bracket as at S. The axis of rotation is inclined in a direction opposite to that in which the distortion occurs and is inclined by an amount equal to or exceeding the amount by which the loop-connecting portion would be distorted if the axis of rotation was not inclined.

For example, if 340a is the normal position of the loop-connecting portion before twisting, or the ideal position of the loop-connecting portion after twisting, and if by twisting it about an axis coaxial with its normal position, the distortion after release by the twister head is to position 340b, then, to correct this, the axis of rotation of the twister is inclined from its normal axis A coplanar with the strip, to the axis $A_v$ by shimming at S. Thereupon, after twisting but before release by the twister head, the loop-connecting portion will be temporarily distorted to the position 340c shown in FIG. 30. Upon release of the strip by the twister, the loop-connecting portion 340 will spring upward to position 340a. By inclining the axis of rotation of the twister in a direction opposite to the normal distortion occurring in the strip, the distortion is compensated or corrected.

It is now apparent that either planar or non-planar distortion of the straight-wire loop-connecting portions is corrected by offsetting the axis of rotation of the twister from the normal axis of the straight-wire portion being twisted, by compelling either eccentric twisting of the loop-connecting portion or twisting about an axis inclined to the plane of the strip. In some instances, as when the gauge of the wire is sufficiently heavy, any distortion creeping into the strip may be corrected simply by offsetting the twisting axis from the normal axis of the loop-connecting portions, and the loops need not be forcibly gripped by jaws in the twister and holder heads. In our copending application Serial No. 677,531, filed August 9, 1957, which issued as U.S. Patent No. 2,964,170 correction for distortion is accomplished without gripping the loops.

Because it is necessary to accurately locate the straight-wire loop-connecting portions in relation to the axis of rotation of the twisters in order to correct for distortion that may creep into the strip, the pants presser wire-strip locator hereinabove described is provided with the V-blades 156a through 156e, with one blade adapted to be received down over each straight-wire loop-connecting portion to be twisted to accurately locate such portions in relation to the axis of rotation of the twisters. Accurate location of the loops in the twister and holder heads is also necessary because the twister and holder heads are only provided with the locating pins 334 and 336 which serve to locate the loops in the heads in only one direction longitudinally of the strip. The wire-strip locator will serve to accurately position the loops to be received by the head so that when the heads are extended to engage and grip the loops, the loops will be positioned against the pins. In FIG. 8 the V-blades are shown embracing the loop-connecting portions $L_1$–$L_2$, $L_3$–$L_4$, $L_4$–$L_5$, $L_9$–$L_{10}$, and $L_{10}$–$L_{11}$. The locator blade 216 cooperates with stationary part 217 to locate straight-wire portion $L_{13}$–E. Because of the tapering mouth 210 of each blade, as the locator comes down over a strip resting in the trough, the straight-wire loop-connecting portions are located in a direction longitudinally of the strip in accurate predetermined relation with the axis of rotation of the twisters. Then as the heads shift in to embrace the wire, the pins 334 and 336 finally position the loops immediately prior to clamping by the jaws.

In the operation of the wire-holding heads, pressurization of motor 253 tending to swing the lower ends of arms 250 and 252 outwardly, will shift the head-carrying spindle assembly toward a wire strip in the trough to carry the head at the end of the spindle assembly into engagement with the wire. With the spindle assembly disposed as shown in FIG. 17 shifting thereof toward the wire-receiving trough will, after a determined amount of travel of the assembly, carry the spacer 310 into abutment with the depending portion 288 of the stop bracket 286 to prevent further travel of the actuating rod 274. With further movement of the rod withheld by bracket 286 and with continued movement of arms 250 and 252, sleeve 258 will be shifted relative to the rod 274 urging the camming surfaces 342 and 344 to ride up the opposed surfaces 346 and 348 of the jaws to close the jaws about a wire strip in the trough. The spacer 310 is adjusted along the threaded portion 276 of actuating rod 274 such that movement of the jaws toward a wire strip in the trough is interrupted when the jaws have embraced a loop of the strip as shown in FIG. 20. Thereafter continued movement of sleeve 258 urges the chuck to slide axially outwardly over the jaws to urge the jaws together to grip the loop.

By virtue of the keyed connection 293, rotation of a holding head H is prevented and the wire is firmly gripped until reversal of fluid pressure to motor 253 swings the arms 250 and 252 to retract the spindle assembly away from the strip. Upon retraction of the assembly the sleeve 258 first moves while rod 274 remains stationary, by virtue of the coil spring 352. As the sleeve moves and the rod remains stationary, spring 328 opens the jaws releasing the wire. When the jaws have been opened, the movement of the coupling sleeve 292 will carry the rod 274 with sleeve 258 back to the at-rest position shown in FIG. 17.

In the operation of the wire-twisting heads, and referring to FIG. 16 and FIGS. 18 and 19, upon pressurization of motor 253 the head is shifted toward the wire strip with the jaws embracing and gripping the strip in a manner similar to that described in connection with a holding head. With the jaws in gripping embracement with a loop of the strip, pressurization of motor 273, retracting the piston into the motor, serves to swing arm 268 and draw the rack bar 265 downwardly thereby rotating sleeve 258. Because the chuck unit of the twisting head is fixedly connected to the end of sleeve 258, the head is rotated upon rotation of the sleeve. The amount of rotation of the head is limited by the stop 283. Upon reversal of fluid pressure to motor 253 swinging arms 250 and 252 from the dotted outline position shown in FIG. 16 to the solid outline position, the head is retracted from the wire strip in a manner similar to that described in connection with the retraction of a holding head. When the head has been retracted from the wire, reverse fluid pressurization of motor 273 serves to rotate the head to the starting position.

In order to limit the amount of gripping force applied by the jaws to the wire strip, a stop 360 is threaded into the brackets 242 such that the plate 304 will abut the stop to limit the amount of swing of arms 250 and 252, as shown in FIG. 16.

Wire Crimpers

The machine is provided with means for crimping the bights of certain loops of the wire at the points 364, 366, and 368 as shown in FIG. 6. The crimps imparted to the wire at these points serve to impart an arcuate shape to that portion of the wire between the V bends formed at the opposite ends of the strip. These crimpers bend the wire by the cooperation of vertically disposed dies shown in FIGS. 11 and 12 between which the bight portion of loops of the wire strip are disposed and when the dies relatively shift toward each other, the bight portions therebetween are bent or crimped. These crimping devices must be retracted away from the wire strip in the trough in order to permit removal of the strip and the replacement with a new strip to be bent. Each crimper includes a crimper head supported for movement toward and away from a wire strip. The crimper head carries or includes the cooperating dies or jaws which embrace the loop to be crimped and crimp the same upon movement of the dies toward each other.

Referring to FIGS. 2, 10, 13, and 14, the crimpers, three of which are provided in the disclosed embodiment at C-1, C-2, and C-3, are supported for adjustable shiftable movement longitudinally of the machine upon a pair of hingedly supported, T-slotted longitudinally extending plates 370 and 372. Each plate is provided with a pair of ears 374 and 376 which are received in opposite ends of transversely extending H-shaped pivot-supporting blocks 378 and 380, see FIG. 13, which are secured as by welding to the upper surface of a horizontally extending plate 382 resting upon the transverse frame members 46 and 48 and bolted thereto as by bolts 384. Pivot pins 386 pivotally connect the ears 374 and 376 to the pivot-supporting blocks.

Extending along beneath the T-slotted plates 370 and 372 are reinforcing bars 388 and 390, see FIGS. 10 and 14, with vertically disposed bracing members 392 and 394 welded to the bars 388 and 390 and to the plates 370 and 372. The ears 374 and 376 are in turn welded to the plates 370 and 372 and to the members 392 and 394. Vertically extending stop members 396 are theadedly received in cross frame members 46 and 48 as shown particularly in FIG. 10 and limit downward swinging of the plates 370 and 372. Upward swinging of plates 370 and 372 is limited by stop members 398 and 400 shown in FIGS. 10 and 13. The latter stop members comprise bolts threaded into the upper ends of supporting block 402 and 404 which are welded to the ends of plates 370 and 372 and to the reinforcing members 388 and 390 as shown in FIGS. 10 and 13. The inner ends of the bolts are adapted to abut upstanding abutments 406 and 408 which are welded to opposite ends of plate 382 and braced by web members 410 welded between the H-shaped members 378 and 380 and the abutments 406 and 408, as shown particularly in FIG. 13. The heads of the stop bolts 398 and 400 may abut inserts 412 in the abutment members 406 and 408.

The plates 370 and 372 are vertically shifted by a fluid pressure motor 414 shown in FIG. 14 which is bolted as at 416 to a plate 418 welded to the underside of plate 382 midway between its opposite ends. The motor is double-acting and is provided with a piston 420 which extends through an aperture 422 in the plate 382. The upper end of the piston is pivotally connected to a horizontally extending link 424 by means of a pin 426, as shown in FIGS. 13 and 14. Two pairs of arms, 428 and 430, and 432 and 434, one pair connected to each of the plates 370 and 372 and interleaved as shown in FIG. 13, are connected to opposite ends of link 424 by means of pivot pins 436 and 438. From a consideration of FIG. 13 it will be noted that the arms of each pair lie on opposite sides of link 424 and the pins 436 and 438 extend through the ends of each pair of arms and through the link. Upon upward movement of link 424 by pressurization of fluid pressure motor 414, the plates 370 and 372 are swung upwardly and vice versa.

The crimpers are mounted on the plates 370 and 372, two being mounted on plate 370 and one on plate 372, by means of bolts 440, the heads of which are received in the T-slots 442 in the plates. Each crimper includes a base plate 443 having elongate slots 444 through which the bolts extend with the slots permitting adjustment of the crimpers transversely of the plates 370 and 372 while the T-slots 442 permit adjustment of the crimpers longitudinally of the plates. The base plates 443 each have an upstanding web portion 446 to which is welded a pair of upstanding arms generally indicated at 448. At the upper ends of the arms is the crimper head, which is indexed toward and away from a strip in the trough through aperture 449 in the sides of the trough. A reinforcing plate 450 is welded to the web and arms to reinforce the connection therebetween. Pivotally mounted on web 446 by pin 452 is double-acting fluid pressure crimper motor 454 having a piston rod 456 connected to the lower end of bifurcated member 458. The lower end of motor 454 includes a bifurcated portion 460 the ears of which embrace the web 446 with the pin 452 extending therethrough as shown in FIG. 15.

Bifurcated member 458 at the upper end of piston rod 456 includes elongated ears 462 and 464 through the upper ends of which extends a pin 466. The upwardly extending pair of arms 448 is provided with a head portion 468 which is received within the bifurcated member 458 with the pin 446 extending through the head. The pair of arms 448 are held in spaced-apart relation adjacent the head 468 by a spacer 474. The head portion 468 comprises extensions 470 and 472. Each of the extensions is provided with an inclined slot 476 through which pin 446 extends.

Received between the extensions is a jaw-carrying crimper plate 478 provided with a slot having angularly related portions 480 and 482 and through which the pin 446 extends. Bolted as at 484 to the crimper plate 478 is a crimping jaw or die 486. The jaw may be either flatted or female, as shown in FIGS. 11 and 12, depending upon whether the crimp is to be imparted upwardly or downwardly. The female jaw or die in FIG. 11 is provided with a V-groove as at 488. In FIG. 12 the jaw is provided with a flatted portion 492. The jaw cooperates with an opposed jaw 494 having an ear portion 496 received between the upper ends of the extensions 470 and 472 and held in engagement therewith by a T-shaped plate 498 through which extends a bolt 500 threaded into the jaw as shown in FIGS. 11 and 12. The jaw 494 is either flatted or female as shown in FIGS. 11 and 12.

The upper jaw 494 is stationary during crimping. The lower jaw 496 is movable and is shifted vertically upwardly toward jaw 494 to crimp the bight of a loop disposed between the jaws. The crimping mechanism shown in FIG. 14 is in the position to which it moves to crimp a wire strip in the wire-receiving trough of the machine. Upon pressurization of motor 414 shifting piston 420 upwardly, plates 370 and 372 are swung downwardly and outwardly thereby swinging the crimping heads outwardly away from a strip disposed in the wire-receiving trough. The crimping plate 478 is pivotally connected as by pin 502 between the extensions 470 and 472. Upon pressurization of motor 454 urging piston 456 outwardly, pin 446 is carried upwardly through slots 476 in the arms 470 and 472 and into the inclined slots 482 in the crimping plate. Upward travel of pin 446 in inclined slot 482 serves to swing jaw 486 downwardly away from upper jaw 494. Control means hereinafter described serve to synchronize operation of fluid pressure motors 414 and 454 whereby each crimper is swung in to dispose the jaws 486 and 494 in embracing relation with the wire strip and thereafter the motor 454 is energized to retract piston rod 456 to swing jaw 486 upwardly toward jaw 494 to crimp the strip therebetween. Upon completion of the crimping operation, motor 454 is energized to extend the piston 456 to swing the lower jaw 486 away from the upper jaw releasing the wire strip, and motor 414 is pressurized to extend piston 420 and swing the crimper outwardly away from the wire strip to permit removal of the strip and the insertion of a new strip in the trough.

In addition to the crimpers C-1, C-2, and C-3, twister T-222 also serves to impart a bend to the bight of one of the loops of the wire strip, specifically loop $L_9$, as shown particularly in FIG. 5. Such loop is bent upon rotation of twister T-222, because the jaws of such twister engage only substantially one-half of the length of the bight of loop $L_9$, with the remainder of the loop resting on an anvil 142 disposed beneath the loop. Upon rotation of twister T-222, the strip is bent as at 512 in FIGS. 5 and 6. The anvil is secured as by machine screws 510 to the plate 108 and spaced slightly from the jaws of head T-222.

*Sequence of operation and control circuits*

In the operation of the machine, and with all of the twisting and holding heads retracted and the crimpers retracted, the operator places a strip of preformed formed wire in the trough of the machine, and then depresses a start button to commence operation of the machine. Upon pressing the start button, the pants presser locater L swings down over the strip and each of the V blades 156a–156e embraces that straight wire portion disposed beneath the blade with the straight-wire portion accurately located with respect to the axis of rotation of the twisters. At the time the wire locator moves down to locate the transverse, or straight-wire loop-connecting portions of the strip, a timing mechanism in the machine commences operation, and the length of time that the wire locator remains in engagement with the wire strip is determined by the timing mechanism. The timing mechanism is of conventional construction and will not be described in detail. Suffice it to say that it periodically energizes a stepping relay or the like at the end of each of a succession of time intervals. The beginning of each time interval is dependent on the expiration of the preceding time interval. The stepping relay upon each energization serves to open or close preselected enslaved switches, which in turn control operation of the fluid pressure motors of the machine. Upon expiration of the first time interval, the stepping relay is energized and the wire-twisting and holding heads move in to embrace the wire strip.

Upon expiration of the first time period, a second time period in the timing mechanism begins to run and it is during this second period that the twister and holder heads along with the crimpers move in to engage the strip. Upon expiration of the second time interval, and during the third time interval, the wire locator swings upwardly and back to its at-rest position. This third time interval lasts only long enough to permit the locator to clear away from the strip and then expires and a fourth time interval commences. Simultaneously with the commencement of the fourth time cycle, the twisters T-218 and T-228 at opposite ends of the strip rotate to bend the ends of the strip and crimpers C-1, C-2, and C-3 are actuated to crimp the strip. This time cycle lasts only long enough to permit these twisters and crimpers to bend the strip and then it expires.

Upon expiration of such time cycle, a fifth cycle commences during which twisters T-218 and T-228 are retracted along with wire holders H-234 and H-232. During this time period the crimpers C-1, C-2, and C-3 are actuated to release the strip. This time cycle lasts only long enough for such twisters and holders to retract, and the crimpers to release the strip and then it expires with a sixth time period commencing. Upon commencement of the new period, the wire twisters T-220 and T-224 are rotated to bend the strip. The time cycle lasts only long enough for such twisters to bend the strip and then the cycle expires and a seventh time period starts. Upon commencement of the new period, the twisters which have just rotated to bend the wire, twisters T-220 and T-224, are retracted along with wire-holding heads H-236 and H-238. During this period the crimpers C-1, C-2, and C-3 are also retracted. This time cycle lasts only long enough for these heads and crimpers to retract and then it expires, starting the eighth time cycle.

This new cycle initiates rotation of the last pair of rotatable heads still in engagement with the strip, heads T-226 and T-222, with the cycle lasting only long enough for such heads to bend the strip, and then it expires. Upon expiration of such time cycle, the timing mechanism is returned to zero time and heads T-226, T-222, and H-230 still in engagement with the wire are retracted. The operator then lifts the wire out of the trough and the machine is ready to recycle.

A schematic wiring diagram of the electrical circuits of the machine is shown in FIG. 22. It will be understood that each of the fluid pressure motors shown in the various figures of the drawing are supplied with fluid pressure from a suitable source of fluid pressure, and that control valves in the fluid pressure lines feeding the motors control the operation of the motors. All of the motors are double-acting. The control valves controlling operation of the motors serve, when shifted to one position, to admit fluid pressure to one end of the motors and when shifted to the opposite position, serve to admit fluid pressure to the opposite end of the motor. Each valve is actuated by a solenoid and a spring return, with energization of the solenoid serving to shift the valve to one position, and upon de-energization of the solenoid, the spring returns the valve to the opposite position.

Considering FIG. 22, the control circuits may be operated from a source of 110 v. alternating current, or any other voltage which is suitable. The cirruit arrangement includes a start button which, upon depression, energizes a master relay solenoid CR-1 having normally open enslaved switches CR-1A, CR-1B, and CR-1C. Closure of switch CR-1C energizes the solenoid valve controlling the pants presser motor 150 to lower the V-blade into contact with the strip. Closure of enslaved switch CR-1B serves to energize master relay solenoid CR-2, which in turn closes enslaved switches CR-2A through CR-2L. CR-2 also closes switch TCL serving to institute operation of timing mechanism indicated schematically at 514. Such timing mechanism, as mentioned, is of conventional construction and is provided with a stepping relay which is stepped from one position to another upon the expiration of successive time intervals. The stepping relay serves, at each step, to energize solenoids connected to switches TDL–A, TDL–B, TDB, TDC–A, etc. At each stepped position of the stepping relay, certain of these switches are actuated.

A full-wave rectifier 516 having a ripple suppressor condenser 518 serves to provide a power source for electronic timing devices in the timing mechanism. The first time cycle TDA which began to run upon closure of switch TCL expires and the second time cycle TDB commences. Upon commencement of time cycle TDB, the enslaved switch TDB is closed, energizing master solenoid CR-3. Upon energization of CR-3, enslaved switches CR-3A, CR-3B, and CR-3C close. The closure of these enslaved switches serves to energize the solenoid valves for the fluid pressure motors 253 and motor 414 serving to shift the crimpers and wire-twisting and holding heads inwardly toward the wire strip.

Time cycle TDB expires and a new cycle TDC commences. As time cycle TDC commences, it serves to open the two enslaved switches TDC–A and TDC–B. Opening of TDC–A de-energizes CR-1, opening switch CR-1C. Opening of TDC–B de-energizes the solenoid valve controlling operation of the fluid pressure motor 150 of the wire strip or pants presser locator to reversely pressurize the motor to return the locator to the at-rest position.

Cycle TDC expires and new cycle TDD commences and on commencement serves to close enslaved switch TDD–A, thereby energizing solenoid valve controlling operation of the fluid pressure motors 154 for actuating the crimper dies or jaws 486, causing the same to crimp the wire strip. Time cycle TDD also closes enslaved switch TDD–B, thereby energizing the solenoid valves controlling operation of the fluid pressure motors 273 for rotating twisters T–228 and T–218, which thereupon twist loop-connecting portions $L_{13}$–E and $L_1$–$L_2$ of the wire strip.

Time cycle TDD expires and new cycle TDE commences. Upon commencement of cycle TDE, enslaved switches TDE–A and TDE–B are opened, thereby respectively causing the solenoid valve controlling the crimping action of crimpers C–1, C–2, and C–3 to reversely pressurize motors 454 to release the crimping jaws from the strip, and cause the solenoid valve controlling indexing of twisting and holding heads H–234, H–232, T–228, and T–218 to reversely pressurize motors 253 to retract such heads from the wire strip.

Time cycle TDE expires and a new cycle TDF commences, which serves to open enslaved switch TDE–A and close switch TDF–B, thereby causing the solenoid valves controlling twister motors 273 of twisters T–228 and T–218 to reversely pressurize the motors to rotate such twisters back to their starting positions, and also energize the solenoid valves controlling rotation of twisters T–220 and T–224 to cause such twisters to twist the loop-connecting portions $L_3$–$L_4$ and $L_{10}$–$L_{11}$ of the wire strip.

Time cycle TDF expires and new cycle TDG commences, serving to open enslaved switches TDG–A and TDG–B, which serve to de-energize the solenoid valves controlling indexing of the crimpers $C_1$–$C_2$ and $C_3$ and of the wire-twising and holding heads H–236, H–238, T–224, and T–220 reversely pressurizing the indexing motors 414 and 253 thereof to retract these heads and crimpers from the wire strip.

Time cycle TDG expires and new cycle TDH commences, thereby serving to open enslaved switch TDH–A and close enslaved switch TDH–B. Opening and closing of these TDH enslaved switches serves to de-energize the solenoid valve controlling rotation of twisters T–220 and T–224 to reversely pressurize the motors 273 of such twisters to rotate the twisters back to their starting position, and also energize the solenoid valves controlling rotation of heads T–222 and T–226, to cause such twisters to rotate to twist loop-connecting portion $L_4$–$L_5$ and crimp loop $L_9$ of the wire strip.

Time cycle TDH expires and a new cycle TDJ commences. Cycle TDJ serves to open normally closed switch TDJ–A, thereby serving to de-energize the solenoid valve for indexing heads H–230, T–226, and T–222, to cause such heads to retract away from the wire strip.

Time cycle TDJ expires and the new cycle TDK commences. TDK serves to open normally closed switch TDK–A to de-energize the solenoid valve controlling rotation of the heads T–222 and T–226 to cause such twisters to rotate to their starting positions.

Time cycle TDK expires and new cycle TDL commences. TDL serves to open enslaved switches TDL–A and TDL–B. Opening of switch TDL–A de-energizes master relay CR–2 to open all of the enslaved CR–2 switches, and also de-energize master relay CR–3, thereby opening all of the enslaved CR–3 switches. Closing of TDL–B returns the timing mechanism 514 to zero in preparation for the next cycling of the machine. At this point all of the switches are opened and the operator reaches in and removes the wire strip from the trough of the machine.

The emergency stop and reset button functions to drop out relays CR–2 and CR–3 to immediately return all machine functions to their normal off position. The emergency stop button also momentarily closes the electronic zeroing circuit of the timing mechanism 514 across which enslaved switch TDL–B is also connected to return the timing mechanism to zero ready to commence a new cycle of operation.

During the function of zeroing the timing mechanism, a normally closed relay RS is opened in the circuit to relay CR–2 and this provides a positive lockout of machine operation as a safety function. The timing mechanism may be so adjusted that a strip such as that shown in FIG. 6 may be bent to the position shown in 3.2 seconds.

What I claim is:

1. That method of twisting the straight-wire loop-connecting portions of a preformed formed sinuous wire strip to prevent distortion of the strip comprising: forcibly gripping adjacent oppositely opening loops at opposite ends of the straight-wire portion to be twisted connecting such loops, and rotating one of the loops about an axis offset from the axis of the straight-wire portion while holding the other loop stationary, said offset being such that upon release of said loops after said rotation said straight-wire portion will compensatively spring to a desired distortion correcting position within the strip.

2. That method of twisting the straight-wire loop-connecting portions of a preformed formed sinuous wire strip to prevent distortion of the strip comprising: forcibly gripping adjacent oppositely opening loops at opposite ends of the straight-wire portion to be twisted connecting such loops, and holding one loop stationary while rotating the other loop about an axis parallel with but offset the axis of the straight-wire portion, said offset being in a direction opposite to the distortion of the straight-wire portion which would occur if the loop was rotated about the axis of the straight-wire portion whereby upon release of said loops after said twisting said straight-wire portion will compensatively spring to a distortion correcting position within the strip parallel to the other straight-wire loop connecting portions of said strip.

3. That method of twisting the straight-wire loop-connecting portions of a preformed formed sinuous wire strip to prevent distortion of the strip comprising: forcibly gripping adjacent oppositely opening loops at opposite ends of the straight-wire portion to be twisted connecting such loops, and holding one loop stationary while rotating the other loop about an axis inclined to the plane of the strip, said inclination being in a direction opposite the distortion occurring if the straight-wire portion were twisted about an axis coplanar with the strip.

4. That method of twisting the straight-wire loop-connecting portions of a preformed sinuous wire strip to prevent distortion of the strip comprising: embracing adjacent oppositely opening loops of the strip at opposite ends of that straight-wire portion to be twisted connecting the loops, and holding one loop stationary while rotating the other loop about an axis parallel with but offset the axis of the straight-wire portion, said offset being in a direction opposite to the distortion of the straight-wire portion which would occur if the loop was rotated about the axis of the straight-wire portion.

5. That method of twisting the straight-wire loop-connecting portions of a preformed sinuous wire strip to prevent distortion of the strip comprising: embracing adjacent oppositely opening loops of the strip at opposite ends of that straight-wire portion to be twisted connecting the loops, and holding one loop stationary while rotating the other loop about an axis inclined to the plane of the strip, said inclination being in a direction opposite the distortion occurring if the straight-wire portion were twisted about an axis coplanar with the strip.

6. A method of bending preformed sinuous spring wire strip of the type having oppositely open adjacent loops lying substantially in a plane with transverse parallel straight wire portions connecting adjacent loops which comprises the steps of gripping a pair of adjacent loops and relatively rotating said loops to twist the straight line portion connecting said pair of loops about an axis offset from the axis of said straight wire portion, said offset being of such predetermined amount and direction with respect to such distortion as would take place within the strip if said straight wire portion had been twisted about its own axis that upon release of said pair of loops after twisting said straight wire portion will spring to a distortion correcting position within the strip.

7. In the method defined in claim 6, the offset axis of twist of said straight wire portion being parallel to said straight wire.

8. In the method defined in claim 6, the offset axis of twist of straight wire portion being inclined with respect to the plane of said strip.

References Cited by the Examiner
UNITED STATES PATENTS

| | | | |
|---|---|---|---|
| 1,206,240 | 11/16 | Norton | 140—91 |
| 2,800,928 | 7/57 | Norman | 140—71 |

CHARLES W. LANHAM, *Primary Examiner.*

MICHAEL V. BRINDISI, *Examiner.*

UNITED STATES PATENT OFFICE
CERTIFICATE OF CORRECTION

Patent No. 3,202,185

August 24, 1965

August T. Gonia et al.

It is hereby certified that error appears in the above numbered patent requiring correction and that the said Letters Patent should read as corrected below.

Column 1, line 43, for "angles" read -- angle --; column 3, line 72, for "wire-tiwisting" read -- wire-twisting --; column 11, line 35, for "loop-connectign" read -- loop-connecting --; column 19, line 35, for "wire-twfising" read -- wire-twisting --; column 20, line 69, after "bending" insert -- a flat --.

Signed and sealed this 15th day of March 1966.

(SEAL)
Attest:

ERNEST W. SWIDER
Attesting Officer

EDWARD J. BRENNER
Commissioner of Patents